US008285049B2

(12) United States Patent
Predovic et al.

(10) Patent No.: US 8,285,049 B2
(45) Date of Patent: Oct. 9, 2012

(54) CORRECTIONS FOR RECOGNIZERS

(75) Inventors: Goran Predovic, Belgrade (RS); Bodin Dresevic, Belgrade (RS); Nikola Letic, Belgrade (RS); Milan Vukosavljevic, Belgrade (RS)

(73) Assignee: Microsoft Corporation, Redmond, WA (US)

( * ) Notice: Subject to any disclaimer, the term of this patent is extended or adjusted under 35 U.S.C. 154(b) by 1160 days.

(21) Appl. No.: 12/134,193

(22) Filed: Jun. 6, 2008

(65) Prior Publication Data

US 2009/0304283 A1 Dec. 10, 2009

(51) Int. Cl.
*G06K 9/00* (2006.01)

(52) U.S. Cl. ......... 382/187; 382/186; 382/188; 382/229

(58) Field of Classification Search .................. None
See application file for complete search history.

(56) References Cited

U.S. PATENT DOCUMENTS

| | | | | |
|---|---|---|---|---|
| 5,257,328 | A | | 10/1993 | Shimizu |
| 5,627,914 | A | * | 5/1997 | Pagallo ............... 382/189 |
| 6,021,218 | A | * | 2/2000 | Capps et al. ............ 382/187 |
| 6,754,386 | B1 | | 6/2004 | Williamson et al. |
| 7,130,798 | B2 | | 10/2006 | Williamson et al. |
| 7,137,076 | B2 | | 11/2006 | Iwema et al. |
| 7,263,657 | B2 | | 8/2007 | Soin et al. |
| 2002/0085772 | A1 | | 7/2002 | Lee |
| 2003/0216913 | A1 | | 11/2003 | Keely et al. |
| 2005/0249419 | A1 | | 11/2005 | Rieman |
| 2006/0062466 | A1 | | 3/2006 | Zou et al. |
| 2006/0062469 | A1 | * | 3/2006 | Li et al. ............... 382/186 |
| 2006/0182344 | A1 | * | 8/2006 | Geidl et al. ............ 382/187 |
| 2008/0056578 | A1 | | 3/2008 | Shilman et al. |
| 2008/0260251 | A1 | * | 10/2008 | Predovic et al. ......... 382/187 |
| 2009/0027552 | A1 | * | 1/2009 | Yang et al. ............. 348/465 |

OTHER PUBLICATIONS

Smithies, et al., "Equation Entry and Editing via Handwriting and Gesture Recognition", Behaviour and Information Technology, vol. 20, No. 1, Jan. 2001 , pp. 1-23.
Kanahori, et al., "On-Line Recognition of Mathematical Expressions Using Automatic Rewriting Method", Proceedings of the Third International Conference on Advances in Multimodal Interfaces , Lecture Notes in Computer Science; vol. 1948 , 2000, pp. 8.
Zeleznik, et al., "Designing UI Techniques for Handwritten Mathematics", EUROGRAPHICS Workshop on Sketch-Based Interfaces and Modeling (2007), The Eurographics Association, pp. 8.
Labahn, et al., "MathBrush: An Experimental Pen-Based Math System", Dagstuhl Seminar Proceedings 06271 Challenges in Symbolic Computation Software, pp. 1-8.

(Continued)

*Primary Examiner* — Jason M Repko
*Assistant Examiner* — David Perlman
(74) *Attorney, Agent, or Firm* — Capitol City TechLaw; Richard C. Irving

(57) ABSTRACT

A processing device may recognize a number of input handwritten strokes, which may represent a mathematical expression, a chemical formula, or other two-dimensional structure. Rewriting rules of a grammar may be applied to the strokes to produce a number of possible recognition results. Each of the possible recognition results has a respective score based on a sum of rewriting rules applied to the strokes to produce respective ones of the possible recognition results. Input may be provided to identify misrecognized strokes and a correct terminal production, or symbol corresponding to the misrecognized strokes. Strokes may be misrecognized for many reasons, including parsing errors, over-grouping or undergrouping of matrices, and improper placement of a recognized terminal production, or symbol, with respect to a root structure. Correction hints may be leveraged for correcting types of errors mentioned above.

20 Claims, 12 Drawing Sheets

OTHER PUBLICATIONS

Mao, et al., "Document Structure Analysis Algorithms: A Literature Survey", 2003, pp. 11.

Krishnamoorthy, et al., "Syntactic Segmentation and Labeling of Digitized Pages from Technical Journals", IEEE Transactions on Pattern Analysis and Machine Intelligence, vol. 15, No. 7, IEEE, Jul. 1993, pp. 737-747.

Kim, et al., "Automated Labeling in Document Images", Proceeding SPIE ,vol. 4307, Document Recognition and Retrieval VIII, 2000, pp. 1-12.

Niyogi, et al., "Knowledge-Based Derivation of Document Logical Structure", Proceedings of the Third International Conference on Document Analysis and Recognition (ICDAR'95), vol. 1, Aug. 14-16, 1995, pp. 4.

Conway, "Page Grammars and Page Parsing. A Syntactic Approach to Document Layout Recognition", Proceedings of the Second International Conference on Document Analysis and Recognition, IEEE, Oct. 20-22, 1993, pp. 761-764.

Miller, et al., "Ambiguity and Constraint in Mathematical Expression Recognition", In Proceedings of the Fifteenth National Conference on Artificial Intelligence, AAAI,1998, pp. 8.

Tokuyasu, et al., "Turbo Recognition: A Statistical Approach to Layout Analysis", In Document Recognition VIII, San Jose, CA, Jan. 2001, pp. 8.

Kanungo, et al., "Stochastic Language Model for Style-Directed Physical Layout Analysis of Documents", IEEE Transactions on Image Processing, vol. 12, No. 5, May 2003, IEEE, pp. 583-596.

Blostein, et al., "Applying Compiler Techniques to Diagram Recognition", Proceedings 16th IAPR International Conference on Pattern Recognition, vol. 3, 2002, pp. 4.

Matsakis, et al., "Recognition of Handwritten Mathematical Expressions", Submitted to the Department of Electrical Engineering and Computer Science, May 21, 1999, Copyright Nicholas E. Matsakis, pp. 1-59.

Lafferty, et al., "Conditional Random Fields: Probabilistic Models for Segmenting and Labeling Sequence Data", Proceedings of the 18th International Conference on Machine Learning, 2001, pp. 8.

Taskar, et al., "Max-Margin Parsing", Proceedings of the Conference on Empirical Methods for Natural Language Processing, 2004, pp. 8.

Charniak, et al., "Edge-Based Bestfirst Chart Parsing", In Proceedings of the Fourteenth National Conference on Artificial Intelligence, 1998, pp. 7.

Klein, et al., "A Parsing: Fast Exact Viterbi Parse Selection", Proceedings of the 2003 Conference of the North American Chapter of the Association for Computational Linguistics on Human Language Technology, vol. 1, pp. 8.

Liang, et al., "Efficient Geometric Algorithms for Parsing in Two Dimensions", Submitted to International Conference on Document Analysis and Recognition (ICDAR), 2005, pp. 1-6.

Rabiner, "A Tutorial on Hidden Markov Models", Proceedings of the IEEE, vol. 77, No. 2, Feb. 1989, IEEE, pp. 257-286.

Collins, "Discriminative Training Methods for Hidden Markov Models: Theory and Experiments with Perceptron Algorithms", Proceedings of the ACL-02 conference on Empirical methods in natural language processing ,vol. 10, Annual Meeting of the ACL, 2002, pp. 8.

Freund, et al., "A Decision-Theoretic Generalization of On-Line Learning and an Application to Boosting", Journal of Computer and System Sciences 55, Academic Press, 1997, pp. 119-139.

Phillips, et al., "CD-ROM Document Database Standard", Proceedings of the Second International Conference on Document Analysis and Recognition, Oct. 20-22, 1993, IEEE, pp. 478-483.

Viola, et al., "Rapid Object Detection Using a Boosted Cascade of Simple Features", Proceedings of the 2001 IEEE Computer Society Conference on Computer Vision and Pattern Recognition, 2001, CVPR, vol. 1, Mitsubishi Electric Research Laboratories, pp. 13.

Bengio, et al., "Word Normalization for Online Handwritten Word Recognition", Proceedings of the 12th Pattern Recognition, vol. 2, Conference B: Computer Vision & Image Processing, 1994, pp. 5.

Blostein, et al., "Recognition of Mathematical Notation", Handbook on Optical Character Recognition and Document Analysis, World Scientific Publishing Company, 1996, pp. 1-26.

Chhabra, "Graphic Symbol Recognition: An Overview", Lecture Notes in Computer Science, Selected Papers from the Second International Workshop on Graphics Recognition, Algorithms and Systems, vol. 1389, 1998, Springer-Verlag, pp. 68-79.

Chan, et al., "Mathematical Expression Recognition: A Survey", International Journal on Document Analysis and Recognition, vol. 3, No. 1, 1999, Department of Computer Science, Hong Kong University of Science and Technology, pp. 1-13.

Freund, et al., "Experiments with a New Boosting Algorithm", In Proceedings of the Thirteenth International Conference on Machine Learning, Jan. 22, 1996, pp. 16.

Plamondon, et al., "On-Line and Off-Line Handwriting Recognition: A Comprehensive Survey", IEEE Transactions on Pattern Analysis and Machine Intelligence, vol. 22, No. 1, Jan. 2000, IEEE, pp. 63-84.

Schapire, et al., "Improved Boosting Algorithms using Confidence-Rated Predictions", Machine Learning, vol. 37, No. 3, Dec. 1999, pp. 1-40.

Shilman, et al., "Discerning Structure from Freeform Handwritten Notes", Seventh International Conference on Document Analysis and Recognition (ICDAR'03), Institute of Electrical and Electronics Engineers, Inc., vol. 1, 2003, pp. 6.

Smithies, et al., "A Handwriting-Based Equation Editor", Proceedings of the 1999 conference on Graphics interface, Morgan Kaufmann Publishers Inc., Jun. 1999, pp. 8.

Tappert, et al., "The State of the Art in Online Handwriting Recognition", IEEE Transactions on Pattern Analysis and Machine Intelligence, vol. 12, No. 8, Aug. 1990, IEEE, pp. 23.

Viola, et al., "Robust Real-Time Face Detection", International Journal of Computer Vision, vol. 57, No. 2, Kluwer Academic Publishers, 2004, pp. 137-154.

* cited by examiner

FIG. 1
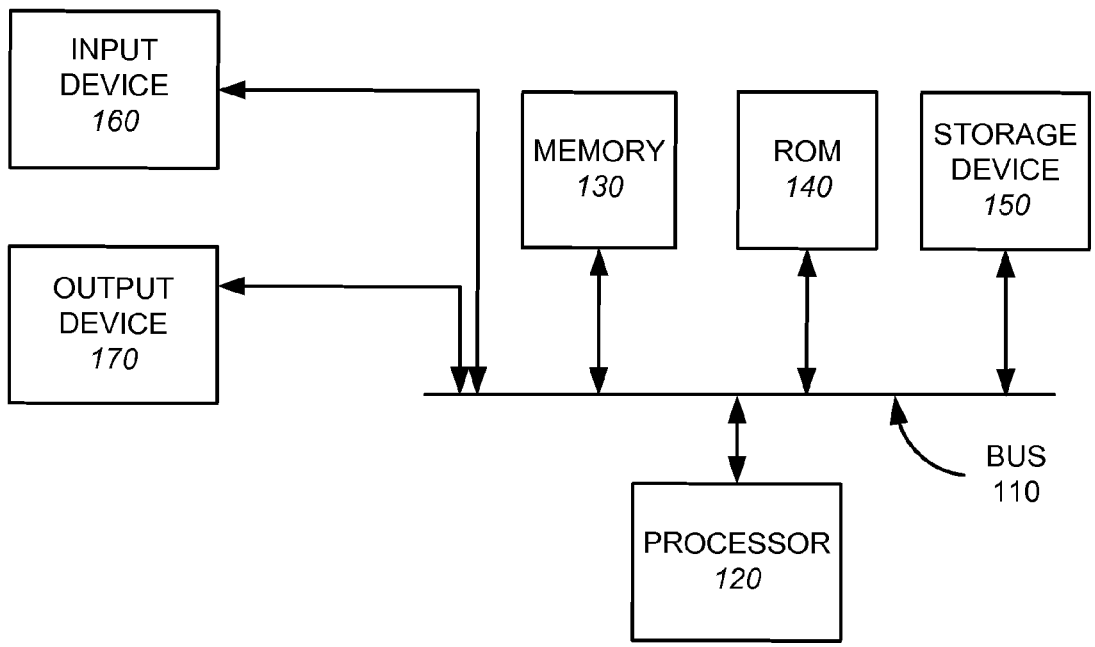
FIG. 2
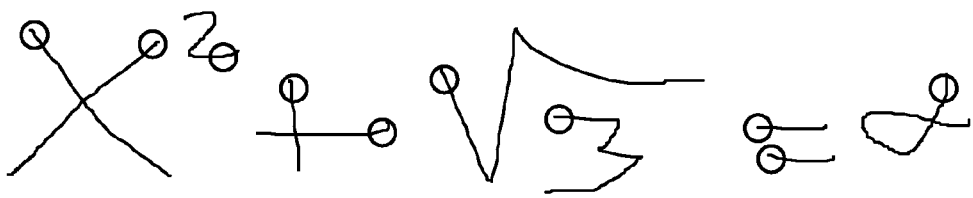
FIG. 3

$$2\int_0^1 \frac{x^2 \sin\alpha}{\tan\beta}\,dx = g(t) \Big\} \text{\textit{602}}$$

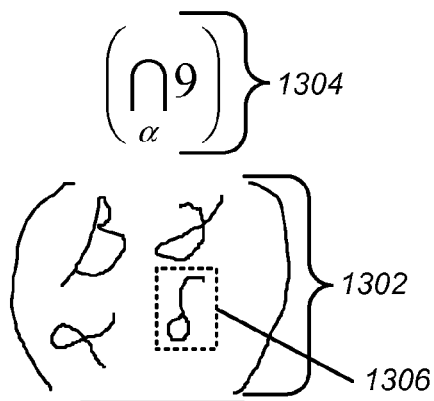
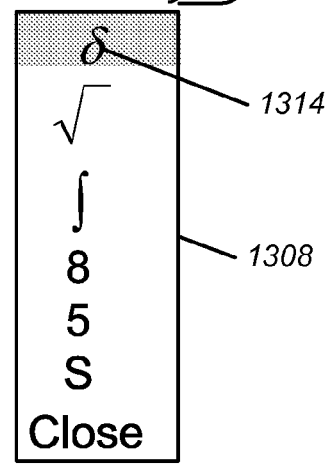
FIG. 13
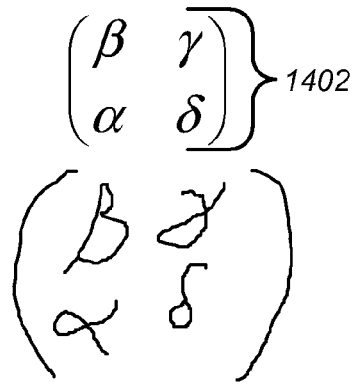
FIG. 14
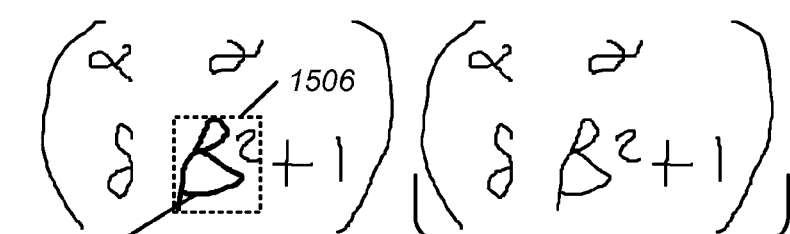
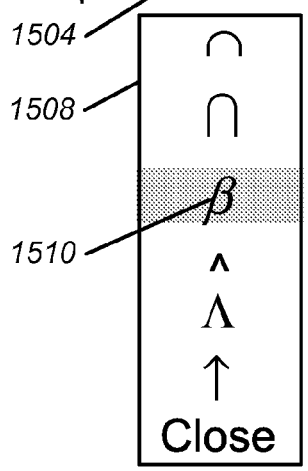
FIG. 15
FIG. 16

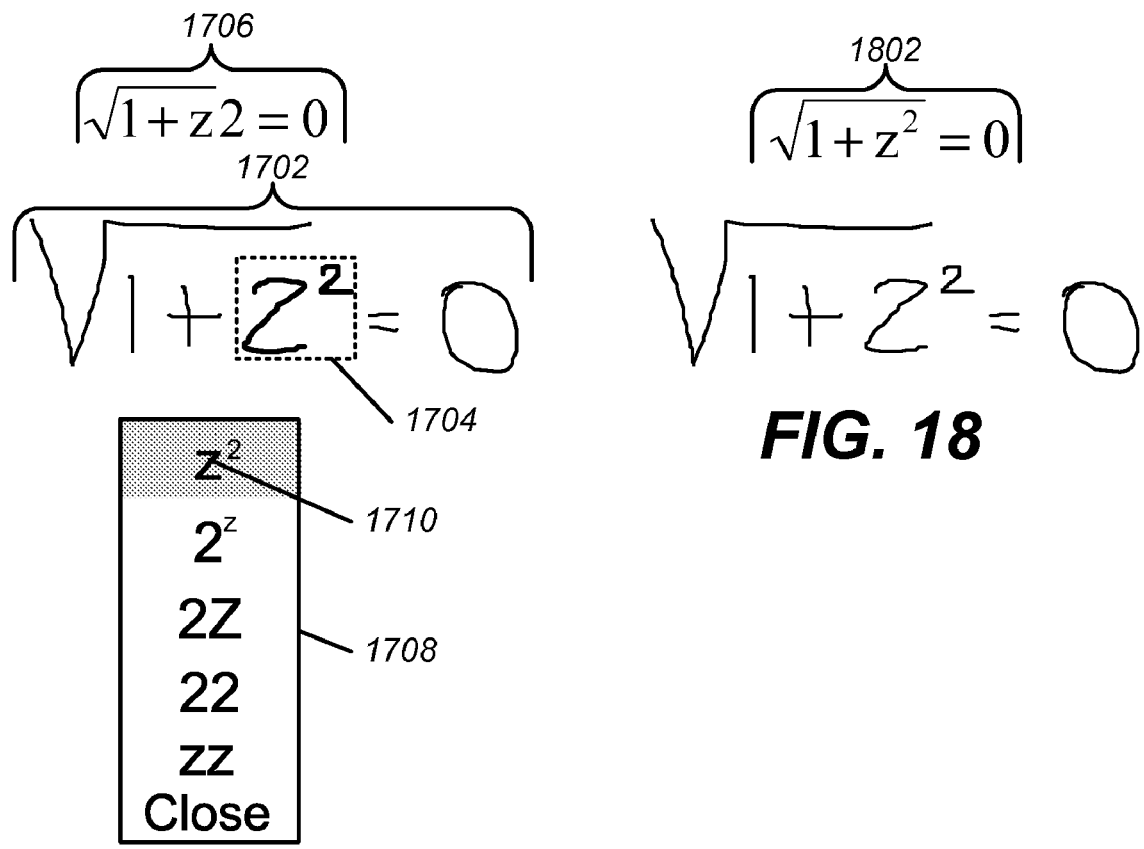
FIG. 17
FIG. 18
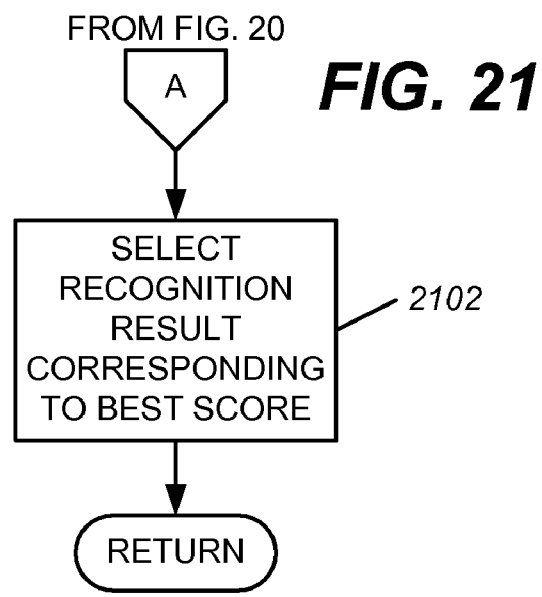
FIG. 21

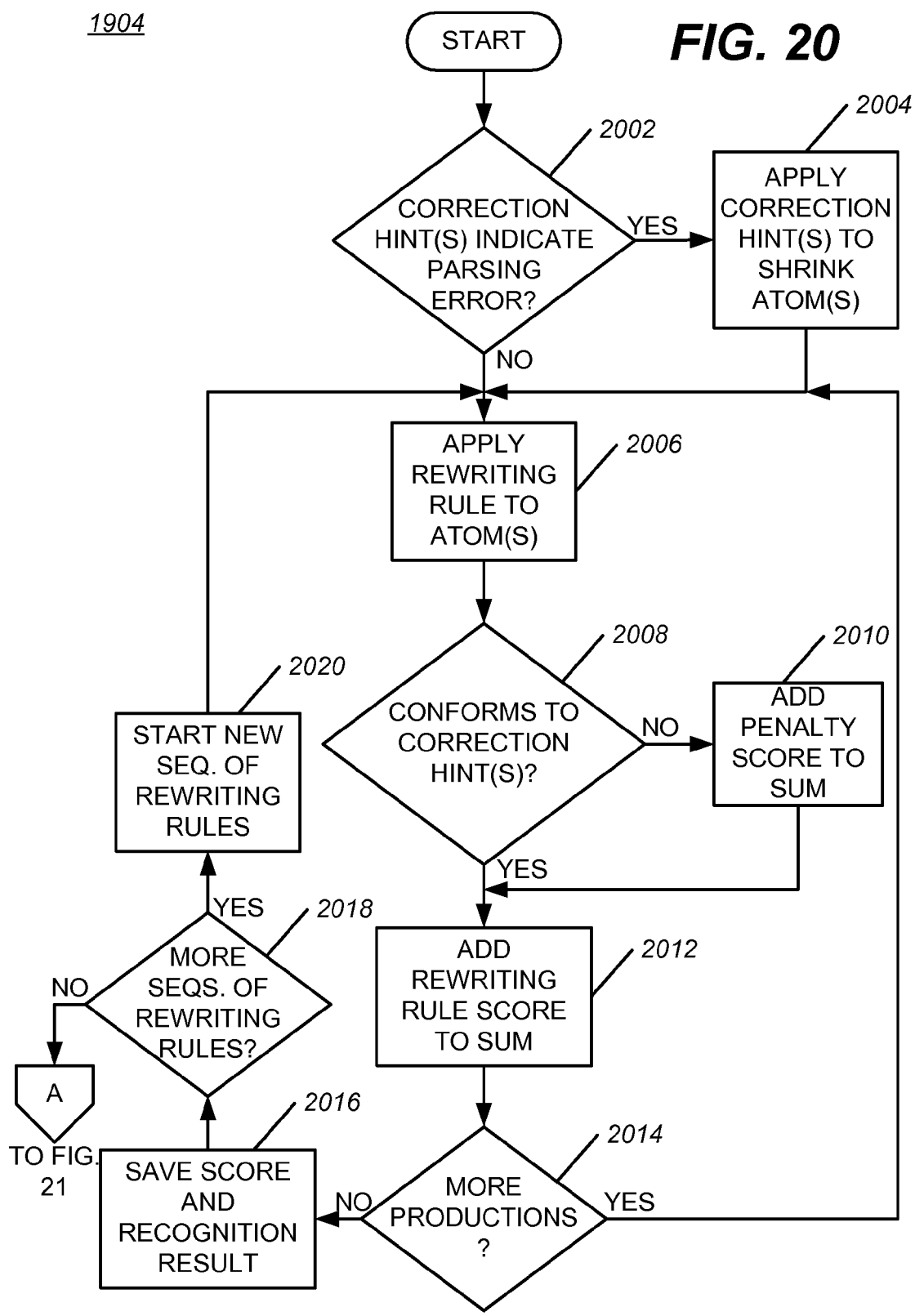

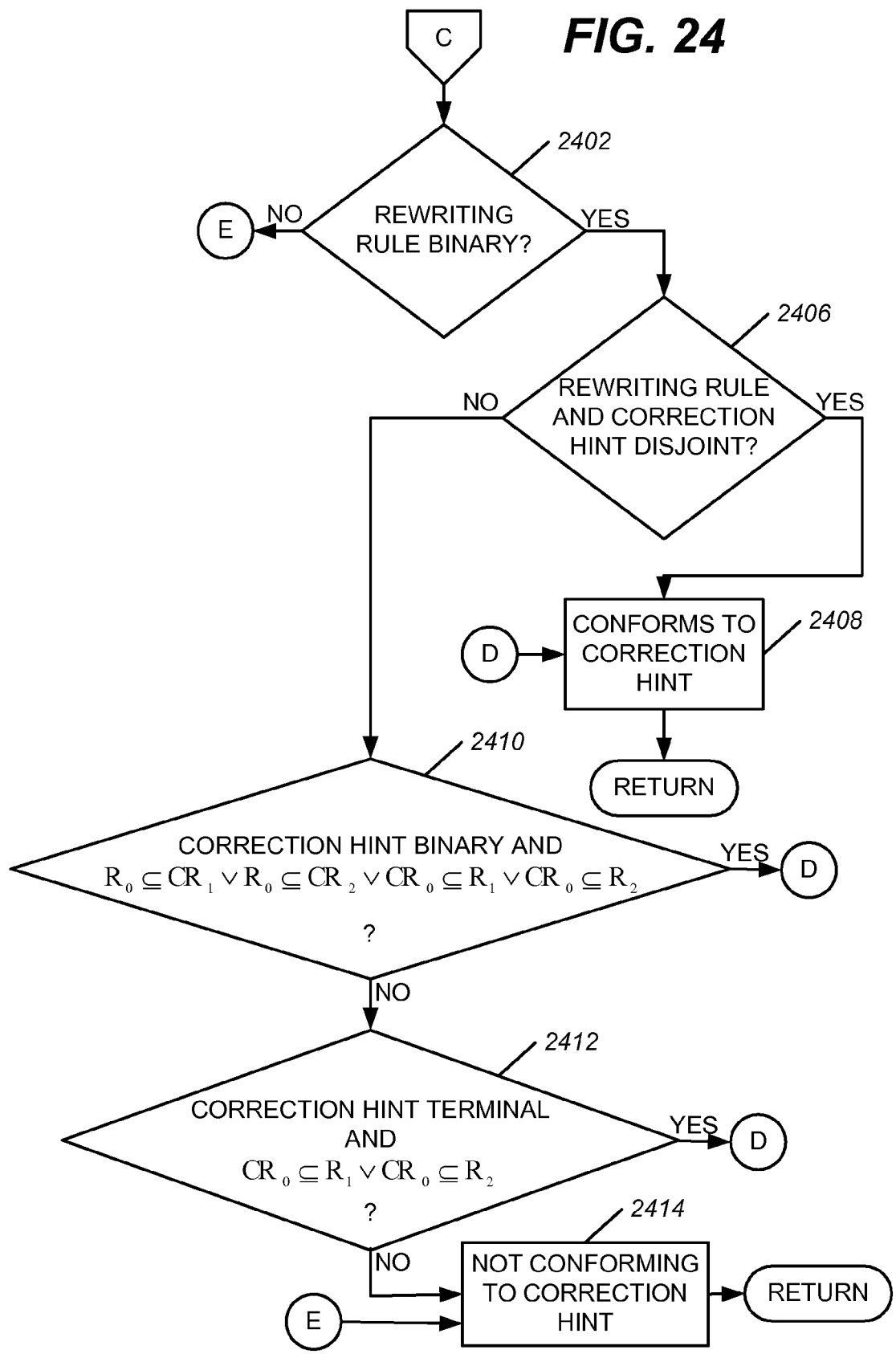

CORRECTIONS FOR RECOGNIZERS

BACKGROUND

Many state-of-the-art processing devices, such as tablet personal computers (PCs) or other processing devices, permit a user to provide input as digital ink. The digital ink may include one or more handwritten strokes, which a processing device may display as ink while the one or more handwritten strokes are being input. A handwritten stroke may begin when a writing instrument lands on a writing surface, and may end when the writing instrument is lifted off the writing surface. The writing surface may include a display screen, which may further include a digitizer, and the writing instrument may be an electronic or non-electronic pen, a stylus, a user's own finger, a pointing device, such as, for example, a computer mouse, or another writing instrument.

A user may input one or more handwritten strokes, as digital ink, to form a two-dimensional structure. The two-dimensional structure may include a mathematical expression, a chemical formula, textual characters, numbers, or other two-dimensional structures.

Existing recognizers may produce a recognition result having a misrecognized portion. The user may attempt to correct the misrecognized portion by selecting the misrecognized portion of the recognition result. In at least one existing recognizer, the user may attempt to correct a misrecognized character of the recognition result by selecting the digital ink corresponding to the misrecognized character. Selecting the misrecognized portion of the recognition result, or selecting the digital ink corresponding to the misrecognized character in the recognition result, may cause one or more alternates to be displayed. The user may select one of the one or more alternates, thereby causing the misrecognized character to be replaced with the selected one of the one or more alternates without re-recognizing the input digital ink. One existing recognizer permits the user to type a correct character from a keyboard when the correct character is not among the displayed one or more alternates.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device are provided for correcting a recognized handwritten two-dimensional structure. A number of handwritten strokes, or atoms may be received and recognized to produce a displayed recognition result. Rewriting rules of a grammar may be applied to terms of the grammar to produce non-terminal productions and terminal productions. A score may be assigned to each of the rewriting rules by a recognizer. A score of each possible recognition result may be a respective sum of scores of rewriting rules applied to produce each respective one of the possible recognition results. A possible recognition result having a best score may be selected as a recognition result to display.

Recognition results may have errors for a number of reasons. Embodiments consistent with the subject matter of this disclosure provide a facility for indicating errors and corrections for the errors (hereinafter, referred to as correction hints). The correction hints may be leveraged during re-recognition of the atoms, such that a correct recognition result may be produced and displayed. Correction hints may be provided for correcting misrecognized symbols, digital ink parsing errors, errors that occur when recognizing particular structures such as, for example, matrices, and mathematical expressions including root structures, and any combination of the above.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 illustrates a functional block diagram of an exemplary processing device, which may implement embodiments consistent with subject matter of this disclosure.

FIGS. 2-18 illustrate a number of correction examples, which may be performed in embodiments consistent with the subject matter of this disclosure.

FIGS. 19-24 are flowcharts illustrating exemplary processing which may be performed in embodiments consistent with the subject matter of this disclosure.

DETAILED DESCRIPTION

Figure 4:
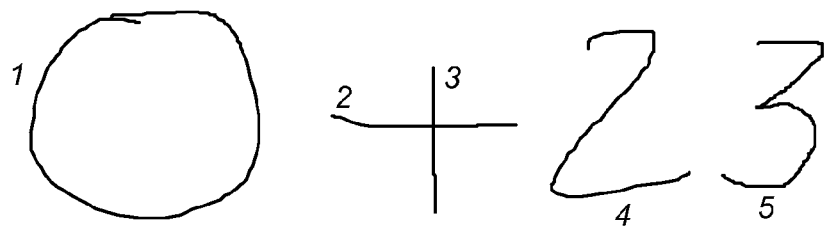

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a method and a processing device for correcting a recognized handwritten two-dimensional structure, which may include a mathematical expression, a chemical formula, or another two-dimensional structure.

A user may input digital ink as a number of strokes, or atoms. The processing device may process the input digital ink to produce a recognition result, which may be presented, or displayed, to a user. The processing device may have one or more recognizers for scoring non-terminal productions, or structures, and terminal productions, or symbols. In this application, the term "terminal production refers to a grammar terminal production, or symbol, which is a non-divisible grammar production. Examples of terminal productions may include, but not be limited to, letters that denote variable names, digits, mathematical operators, mathematical functions (such as sin, cos, arcsin, etc) and symbols.

A grammar may include a number of rewriting rules for producing non-terminal and terminal objects, or productions. The rewriting rules may be applied to terms of the grammar formed by one or more atoms in a region to produce non-terminal and terminal productions. As a rewriting rule is applied to a region, the region may be partitioned to produce multiple subregions. The rewriting rules may be applied until all atoms are recognized as being included in terminal productions. As a rewriting rule is applied to the one or more atoms, a score may be associated with the applied rewriting rule. Thus, for example, the score for a particular recognition result may be a sum of rewriting rules applied to produce the recognition result. The rewriting rules may be applied to the one or more atoms in a number of different ways to produce multiple possible recognition results. One of the possible recognition results having a best score may be selected as the recognition result. In various embodiments, a best score may be a highest score among scores of possible recognition results. In other embodiments, a best score may be a lowest score among the scores of possible recognition results.

Occasionally, recognition results may have a misrecognized portion. Misrecognition of atoms may occur for a number of reasons, such as, for example poor handwriting and ink parsing errors. For example, atoms may be input in such a way that atoms of different terminal productions may overlap, or cross one another, such that the atoms may not be properly recognized. Embodiments consistent with the subject matter of this disclosure, may provide a method and a processing device for providing a correction hint for correcting ink parsing of the atoms. The atoms may then be re-recognized taking the correction hint into consideration.

Further, atoms included in some structures may cause recognition errors due to placement of the atoms within the structures. For example, atoms representing an expression including multiple symbols may be intended to be included under a root symbol ($\sqrt{}$). However, the atoms may be entered such that a first portion of the atoms may be included under the root symbol, while a second portion of the atoms may not be included under the root symbol. As a result, some symbols of the expression may be recognized as being under the root symbol, while others symbols of the expression may be recognized as being outside of the root symbol. Further, atoms representing symbols within a matrix may be placed such that the matrix may be misrecognized as having too many rows or columns, or too few rows or columns. Embodiments consistent with the subject matter of this disclosure may provide a method and a processing device for providing a facility for a user to correct errors with respect to a root symbol or a matrix.

Exemplary Processing Device

FIG. 1 is a functional block diagram of an exemplary processing device 100, which may be used in embodiments consistent with the subject matter of this disclosure. Processing device 100 may include a bus 110, an input device 160, a memory 130, a read only memory (ROM) 140, an output device 150, a processor 120, and a storage device 150. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include compact disc (CD), digital video disc (DVD), a magnetic medium, or other type of storage medium for storing data and/or instructions for processor 120.

Input device 160 may include a keyboard, a touchscreen, or other input device. If input device 160 includes a touchscreen, the touchscreen may further include a digitizer for receiving input from a writing device, such as, for example, an electronic or non-electronic pen, a stylus, a user's finger, or other writing device. In one embodiment, input device 160 may include a pointing device, such as, for example, a computer mouse, or other pointing device. Output device 170 may include one or more conventional mechanisms that output information, including one or more display monitors, or other output devices.

Processing device 100 may perform such functions in response to processor 120 executing sequences of instructions contained in a tangible machine-readable medium, such as, for example, memory 130, ROM 140, storage device 150 or other medium. Such instructions may be read into memory 130 from another machine-readable medium or from a separate device via a communication interface (not shown).

Grammar Parsing Framework

A grammar parsing framework is a method used when recognizing handwritten or printed mathematical equations, chemical formulas, text structures, and graphs, as well as other two-dimensional structures.

A document may be defined as an object subject to recognition, such as, for example, a handwritten mathematical expression, handwritten text, a scanned image of a printed mathematical expression or printed text, a handwritten page of ink drawings, text and diagrams, as well as other handwritten or scanned two-dimensional structures. FIG. 2 shows an exemplary document including a handwritten mathematical expression.

Recognition may be defined as a process of transforming a document into a form understandable by a machine. For example, a handwritten mathematical expression may be transformed to plain text in a MathML format, a Latex format, or another format. The transformed document may be read and searched by a machine and may be suitable for storing and indexing.

A document atom may be defined as an indivisible part of a document and a document may be a collection of atoms. If a document is written in digital ink, then an atom of the document may be a single stroke of the digital ink. In FIG. 3, each atom is circled. As one can see, the mathematical expression of FIGS. 2 and 3 includes 10 atoms.

A document region may be defined as a collection of atoms from a given document. A region R containing atoms $a_1$, $a_2$, and $a_4$ may be written as $R=\{a_1,a_2,a_4\}$. A size of a region R may be defined as a number of atoms in the region and may be written as $|R|$. A maximal document region may be defined as a region that contains all atoms from a document. A maximal document region R may be written as $R=D$.

A document partition may be defined as a pair of document regions, written as $P=(R_1,R_2)$, such that $R_1$ and $R_2$ have no atoms in common ($R_1 \cap R_2=0$) Partition P belongs to a region R if ($R_1 \cup R_2=R$).

A binary context-free grammar (hereinafter referred to as grammar) may be defined as a triplet $G=(T, S, P)$ where:
1. T is a finite set of terms, $T=\{t_1,t_2, t_3, \ldots, t_n\}$;
2. S is a starting term, such that $S \in T$;
3. P is a finite set of productions, $P=\{p_1,p_2,p_3, \ldots, p_k\}$.
   a. A production may be one of: a binary production, a unary production or a terminal production.
   b. A binary production may be defined as a triplet of terms, $p=(t_i,t_j,t_k)$, written as:
      $t_i \rightarrow t_j t_k$
   c. A unary production may be defined as a pair of terms, $p=(t_i,t_j)$, written as:
      $t_i \rightarrow t_j$ d. A terminal production may be defined as a singleton of a term, p=($t_i$), written as:

$t_i \rightarrow$

All three forms of productions may be written simply as ($t_i, t_j, t_k$) by allowing $t_j$ and $t_k$ to be empty sets. Therefore, a unary production may be written as $t_i \rightarrow t_j 0$ and a terminal production may be written as $t_i \rightarrow 00$.

Given a grammar G=(T, S, P), words may be defined as all n-tuples with elements from the set of terms T.

Word Examples May Include:

$w_1=(t_2,t_1)$ $w_2=(t_2)$ $w_3=(t_5,t_5,t_1,t_5)$

A rewriting step may be defined as a transformation of one word into another word by applying a rewriting rule. Word $w_1$ being transformed into word $w_2$, may be written as $w_1 \rightarrow w_2$, using production A→B C as a rewriting rule if: $w_1=(\alpha, A, \beta) \rightarrow w_2=(\alpha, B, C, \beta)$ $w_1=(\alpha, A, \beta) \wedge w_2=(\alpha, B, C, \beta)$ For example, rewriting steps, which follow, with annotated rewriting rules may be performed:

| | |
|---|---|
| (a, x, d) → (a, b, c, d) | x → b c |
| (a, x, d) → (a, y, d) | x → y |
| (a, x, d) → (a, d) | x → |

A sequence of rewriting steps may be defined as a procedure of performing rewriting steps one by one. The sequence of rewriting steps may be written as:

$w_1 \rightarrow w_2 \rightarrow w_3 \rightarrow w_4 \rightarrow \square$

Terminal words in a grammar G may be defined as all words $w_1=(t_1, t_2, \ldots, t_k)$ such that $t_i \rightarrow$ are terminal productions from G.

Grammar words may be defined as all terminal words in a given grammar G that exist in some sequence of rewriting steps starting from a word $w_s=(S)$ (a starting word may consist only of a grammar starting term). If word w is a grammar word, this may be written as:

$(s) \rightarrow^* w_s$

A process of pruning regions and partitions from a document may be called document parsing. If the document includes handwritten ink, the process may be called ink parsing.

RECOGNITION EXAMPLE

A simple exemplary grammar for recognition of numbers and basic arithmetic operations (called numbers grammar) may be defined as following:

1) G=(T, S, P)
2) T={Math, Number, Op, OpNumber, DigitList, Digit, Digit9, 0, 1, 2, 3, 4, 5, 6, 7, 8, 9, +, -}
3) S=Math
4) P={
   Math→Number,
   Math→Math OpNumber,
   OpNumber→Op Number,
   Op→+,
   Op→-,
   +→,
   -→,
   Number→Digit,
   Number→Digit9 DigitList,
   DigitList→Digit,
   DigitList→DigitList→Digit,
   Digit→Digit9,
   Digit→0,
   Digit9→1,
   Digit9→2,
   Digit9→3,
   Digit9→4,
   Digit9→5,
   Digit9→6,
   Digit9→7,
   Digit9→8,
   Digit9→9,
   0→,
   2→,
   3→,
   4→,
   5→,
   6→,
   8→,
   9→,
}

Production names in the simple exemplary grammar are almost all self-explanatory; production Digit9 may represent all digits but zero, production Digit9 exists to ensure that words like '012' may not be generated by the grammar.

The exemplary grammar is a simple grammar which is able to generate words like: 0, 12, 0+12−2000, 1+2+3, etc. A full-size grammar that supports university level mathematics may have thousands of productions and terms.

An exemplary document to recognize is illustrated in FIG. 4. In FIG. 4, every atom is assigned an identifier (1, 2, 3, 4, 5). A sequence of rewriting steps, or rules that may be used to recognize the exemplary document is as follows:

1. (Math, {1, 2, 3, 4, 5})
   a. apply rule: Math→Math OpNumber, {1, 2, 3, 4, 5}→{1} {2, 3, 4, 5}
2. (Math, {1}), (OpNumber, {2, 3, 4, 5})
   a. apply rule: Math→Number, {1}→{1}
3. (Number, {1}), (OpNumber, {2, 3, 4, 5})
   a. apply rule: Number→Digit, {1}→{1}
4. (Digit, {1}), (OpNumber, {2, 3, 4, 5})
   a. apply rule: Digit→0, {1}→{1}
5. (0, {1}), (OpNumber, {2, 3, 4, 5})
   a. 0→is a terminal production
   b. apply rule: OpNumber→Op Number, {2, 3, 4, 5}→{2, 3} {4, 5}
6. (0, {1}), (Op, {2, 3}), (Number, {4, 5})
   a. apply rule: Op→+, {2, 3}→{2, 3}
7. (0, {1}), (+, {2, 3}), (Number, {4, 5})
   a. +→is a terminal production
   b. apply rule: Number→Digit9 DigitList, {4, 5}→{4} {5}
8. (0, {1}), (+, {2, 3}), (Digit9, {4}), (DigitList, {5})
   a. apply rule: Digit9→2, {4}→{4}
9. (0, {1}), (+, {2, 3}), (2, {4}), (DigitList, {5})
   a. 2 is a terminal production
   b. apply rule: DigitList→Digit, {5}→{5}
10. (0, {1}), (+, {2, 3}), (2, {4}), (Digit, {5})
    a. apply rule: Digit→3, {5}→{5}
11. (0, {1}), (+, {2, 3}), (2, {4}), (3, {5})
    a. 3→is a terminal production
12. Recognition finished.

A recognition result from the above example is '0+23'. Symbol '0' is assigned with region {1} (i.e. atom with identifier 1 is recognized as symbol '0'). Symbol '+' is assigned with region {2, 3} (i.e. a group of atoms with identifiers 2 and 3 is recognized as symbol '+'). Symbol '2' is assigned with region {4} and symbol '3' is assigned with region {5}.

There are many combinations of rewriting rules that may be used to recognize the exemplary document of FIG. 4. A recognition engine may assign scores for each of the rewriting rules. A score for a particular recognition result may be a sum of all scores for all rewriting rules used to produce the particular recognition result. A best recognition result may be a recognition result having a best score. Typically, the best score is a highest score. Although, in some embodiments, a best score may be a lowest score.

A following formula may be used to find a best recognition result:

$$C(A, R_0) = \max_{\substack{A \to BC \\ R_1 \cap R_2 = 0 \\ R_1 \cup R_2 = R_0}} C(B, R_1) + C(C, R_2) + \text{score}(A \to BC, R_0, R_1, R_2) \quad \text{Equ. 1}$$

where score( ) may be a score assigned to a rewriting rule and C(A, R) may be a best result, so far, for a given term, A, on a given region, R.

Score( ) may be defined for binary, unary, and terminal productions. For binary productions, score may have a form as shown above in Equ. 1. For unary productions, score may have a form score(A→B 0, $R_0$,$R_1$,0).

For terminal productions, score may have a form score(A→00, $R_0$,0,0).

Correction Feature

Figure 5:
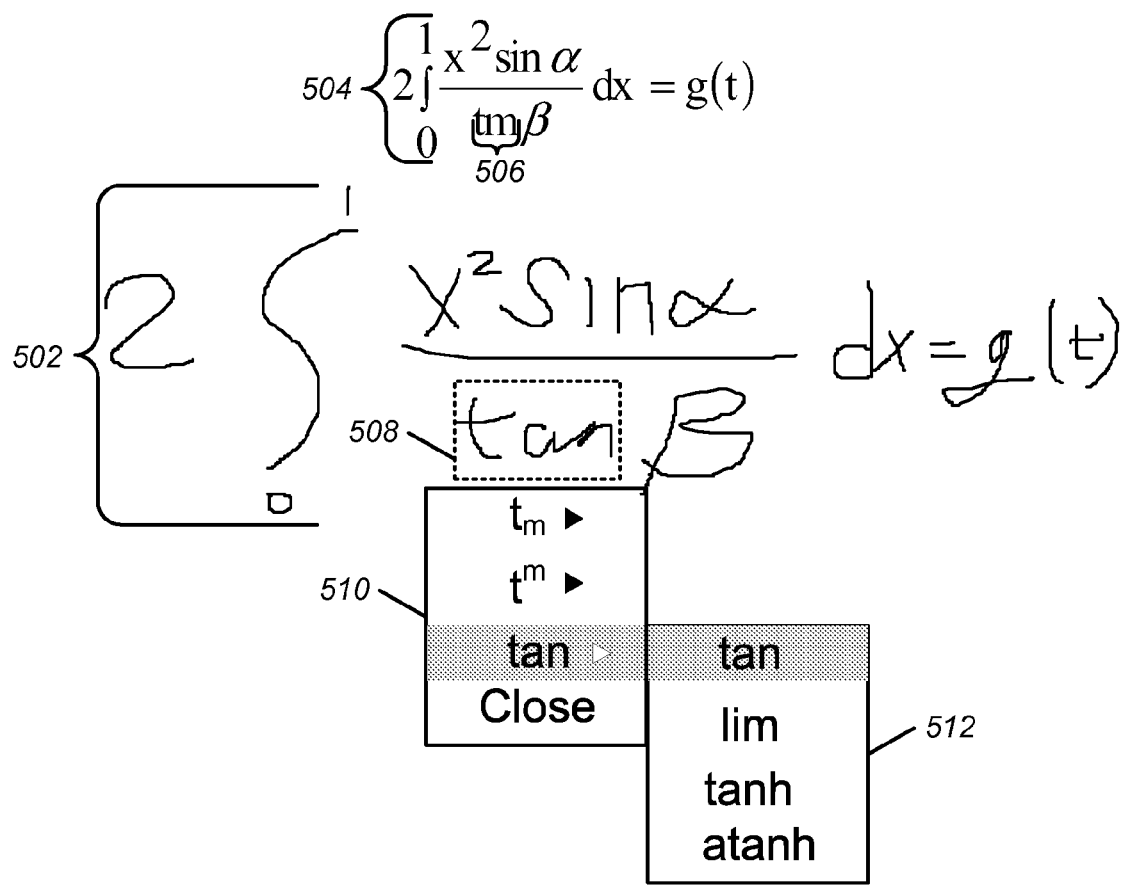

FIG. 5 illustrates a handwritten mathematical expression 502 and a corresponding recognition result 504. Recognition result 504 has a misrecognized portion 506. Recognition result 504 may be obtained by applying multiple combinations of a number of rewriting rules to input atoms, summing scores of applied rewriting rules for each of the multiple combinations, and producing possible recognition results and respective scores for each of the multiple combinations. One of the combinations having a best score, according to Equ. 1, may be selected as recognition result 504.

A user may select one or more atoms, corresponding to misrecognized portion 506, by using a selection tool, such as, for example, a lasso selection tool, to draw a lasso around the one or more atoms. The selection tool may be used via a pointing device, such as, for example, a computer mouse, an electronic pen, a stylus or a user's finger on a touchscreen having a digitizer, or via other input methods. Alternatively, instead of using a lasso selection tool, another selection tool may be used. FIG. 5 shows selected atoms surrounded by a rectangle 508, which may define a region.

Upon selecting the one or more atoms, a recognizer may recognize the one or more atoms in isolation, in the region defined by the selection tool and may add results of recognizing the one or more atoms in isolation to a previously determined list of alternate recognition results for the region. The recognizer may then provide, or display, several recognition results associated with top best recognition scores. The several recognition results may be called possible or alternate recognition results. The user may select one of the alternate recognition results using a selection tool. In FIG. 5, the user selected, from a first menu 510, "tan", which may be highlighted. In this example, selection of "tan" from the first menu may cause a second menu 512 to be presented. Second menu may have a number of alternates related to "tan". In this example, the user selected "tan" from second menu 512 using the selection tool. The selection of "tan" from second menu 512 may be called a correction hint. A correction hint is an element from an alternate list generated over a region R that is selected by a user and provided to a recognizer. Thus, a correction hint is a rewriting rule (A,R)→(B,$R_0$)(C,$R_1$), where (A,B,C) is a grammar production, which may be written as A→BC, and ($R_0$, $R_1$) is a document partition (R=$R_0 \cup R_1$,$R_0 \cap R_1$=0).

The correction feature may be implemented by replacing Equ. 1 with $$C(A, R_0) = \max_{\substack{A \to BC \\ R_1 \cap R_2 = 0 \\ R_1 \cup R_2 = R_0}} C(B, R_1) + C(C, R_2) + \text{score2}(A \to BC, R_0, R_1, R_2) \quad \text{Equ. 2}$$

where score2 is a new scoring function. Score2 may determine whether a rewriting rule respects all correction hints. If the rewriting rule respects all correction hints, then a score for the rewriting rule may be equal to a score using the score function. Otherwise, a penalty score may be added to an assigned score for the rewriting rules. For example, if a best recognition result has a highest score, then if a rewriting rule does not respect all correction hints, score2 may add the penalty score to the score assigned to the rewriting rule. The penalty score may be a large negative value, such as, for example, −100, or another suitable value. In an embodiment in which a best recognition result has a lowest score, the penalty score may be a large positive value, such as, for example, 100, or another suitable value. Adding the penalty score to the score of a possible recognition result may insure is that the possible recognition result will not have a best score and will not be selected as a best recognition result.

Figures 6, 7:
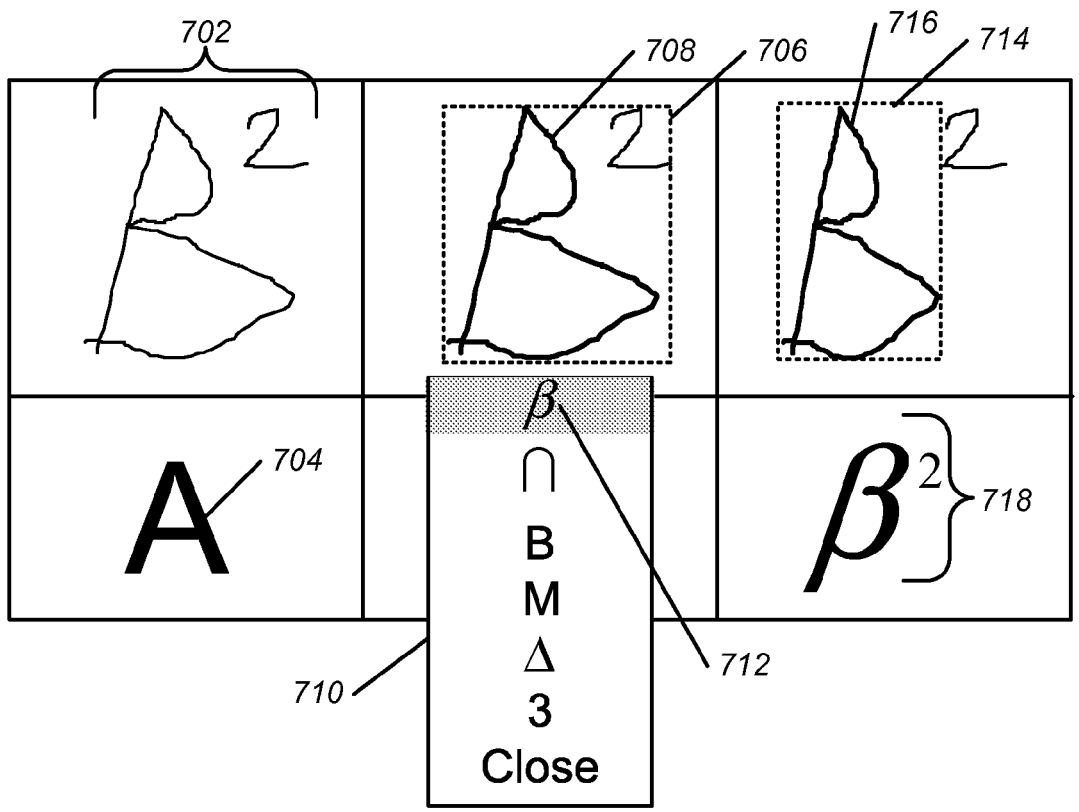

Returning to FIG. 5, after providing the correction hint, input atoms may be re-recognized and a correct recognition result 602 may be produced, as shown in FIG. 6.

Ink Parsing Errors

A number of possible regions and partitions in a document may be exponential. Ink parsing is a process by which regions and partitions may be pruned to a number more suitable for computation. Ink parsing may prune as many regions as possible, while not pruning regions and partitions that are part of a correct, or expected, recognition result.

If, for some reason a region that is part of a correct recognition result is pruned from a document, the document cannot be correctly recognized. The previously-discussed correction feature cannot correct ink parsing errors. After receiving a correction hint and re-recognizing input atoms, a region that is part of a correct recognition result may again be pruned during ink parsing.

Ink parsing errors may be corrected when using a simple ink parsing algorithm having a rule, such that, on a region R, partition P=($R_0$,$R_1$) is valid (R=$R_0 \cup R_1$,$R_0 \cap R_1$=0) if and only if regions $R_0$ and $R_1$ are separable by a horizontal or a vertical line. Ink parsing errors may also be corrected when using a more complicated ink parsing algorithm.

Ink parsing errors may be corrected by shrinking regions based on correction hints. A correction hint may be written as a rewriting rule (A,$R_0$)→(B,$R_1$)(C,$R_2$). A main region $R_0$ may be shrunk such that a probability of the region being pruned may be decreased. As a result of shrinking the region $R_0$, boundaries of the region $R_0$ may be changed and atoms inside the region $R_0$ may be linearly transformed to fit new region boundaries.

FIG. 7 illustrates an ink parsing error and correction of the ink parsing error. A user may input atoms 702, which may be misrecognized as recognition result 704 due to an ink parsing error (note that a region bounding a first atom of input atoms 702 may not be separable from a region bounding a second atom of input atoms 702 by a horizontal or a vertical line). The user may select a region of input atoms 702 using a selection tool. A bounding box 706 showing the region may be displayed. A bounding box may be defined as a minimal rectangle whose sides are parallel to an x and a y axis of a plane which contains a whole region or a whole document atom.

A recognizer may attempt to recognize one or more atoms within bounding box 706. In the example of FIG. 7, the recognizer may attempt to recognize atom 708, as may be indicated by a visual indication such as, for example, displaying atom 708 with a bold line. The recognizer may recognize atom 708, within a region defined by bounding box 706, in isolation, and may present a best recognition result and several alternate recognition results included in a menu 710. The user may select one of the recognition results 712, which may then be highlighted. A shrunken bounding box 714 and transformed input atom 716 are shown such that a bounding box of transformed input atom 716 may be separable from a bounding box of any other input atoms which were originally in bounding box 708. Input atoms 702 may now be correctly recognized to produce correct recognition result 718.

Figure 8:
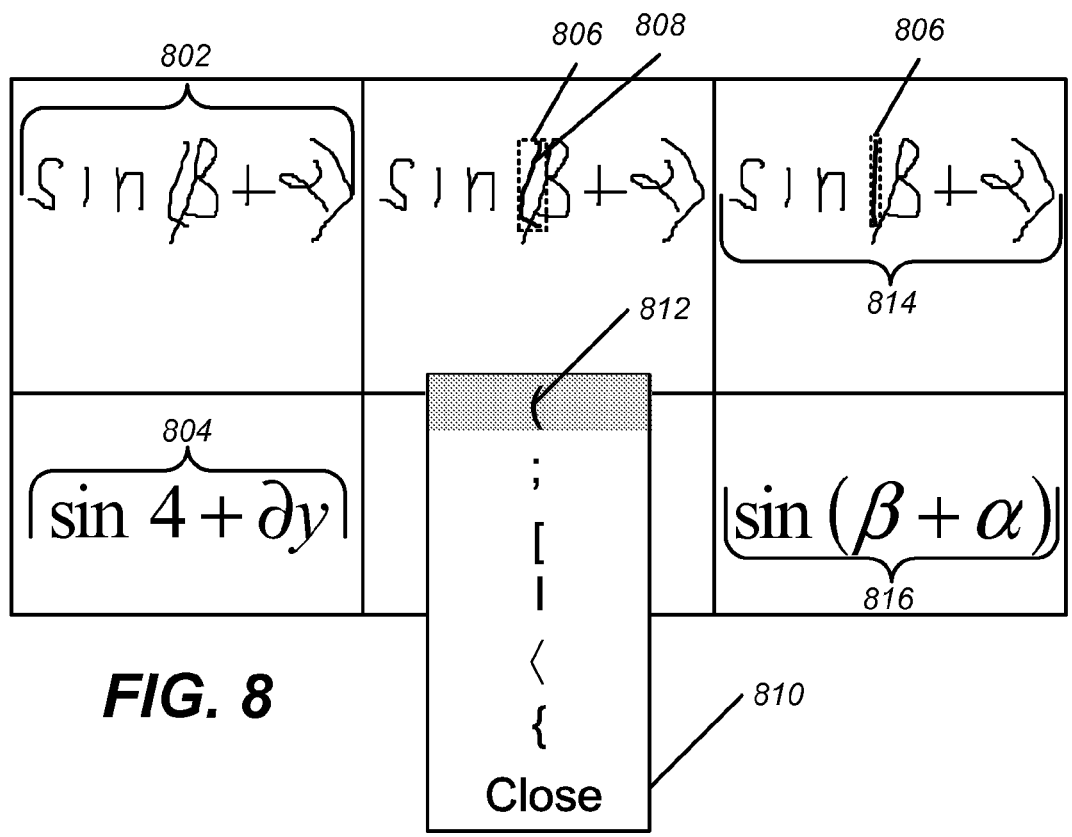

FIG. 8 illustrates another ink parsing correction example. The recognizer may incorrectly parse input atoms 802 such that recognition result 804 is incorrect. Using a selection tool, a user may select a region 806 corresponding to the ink parsing error. Region 806 may be shown by a bounding box surrounding one or more atoms. In this example, the bounding box surrounds atom 808, which is shown in bold. The recognizer may recognize atom 808 in isolation and may provide, or display, a menu 810, including a best recognition result and several alternate recognition results with respect to atom 808. In this example, the user may select recognition result 812 as a correction hint. Region 806 may then be shrunk in order to separate atom 808 from any other atoms that were originally in region 806. Atom 808 may be transformed in proportion to shrunken region 806. Atoms 814 may then be re-recognized to produce correct recognition result 816.

Figure 9:
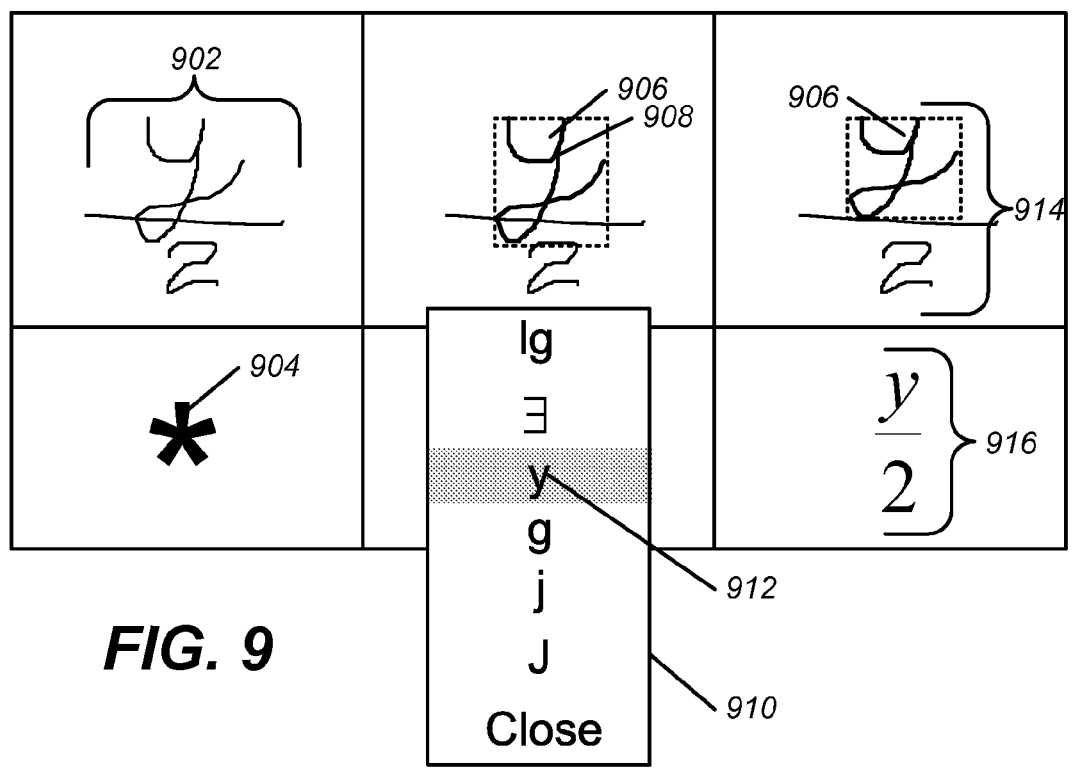

FIG. 9 illustrates a third ink parsing correction example. The recognizer may incorrectly parse input atoms 902 such that recognition result 904 is incorrect. Using a selection tool, a user may select a region 906 corresponding to the ink parsing error. Region 906 may be shown by a bounding box surrounding one or more atoms. In this example, the bounding box surrounds atom 908, which is shown in bold. The recognizer may recognize atom 908 in isolation and may provide, or display, a menu 910, including a best recognition result and several alternate recognition results with respect to atom 908. In this example, the user may select recognition result 912 as a correction hint. Region 906 may then be shrunk in order to separate atom 908 from any other atoms that were originally in region 906. Atom 908 may be transformed in proportion to shrunken region 906. Atoms 914 may then be re-recognized to produce correct recognition result 916.

Figure 10:
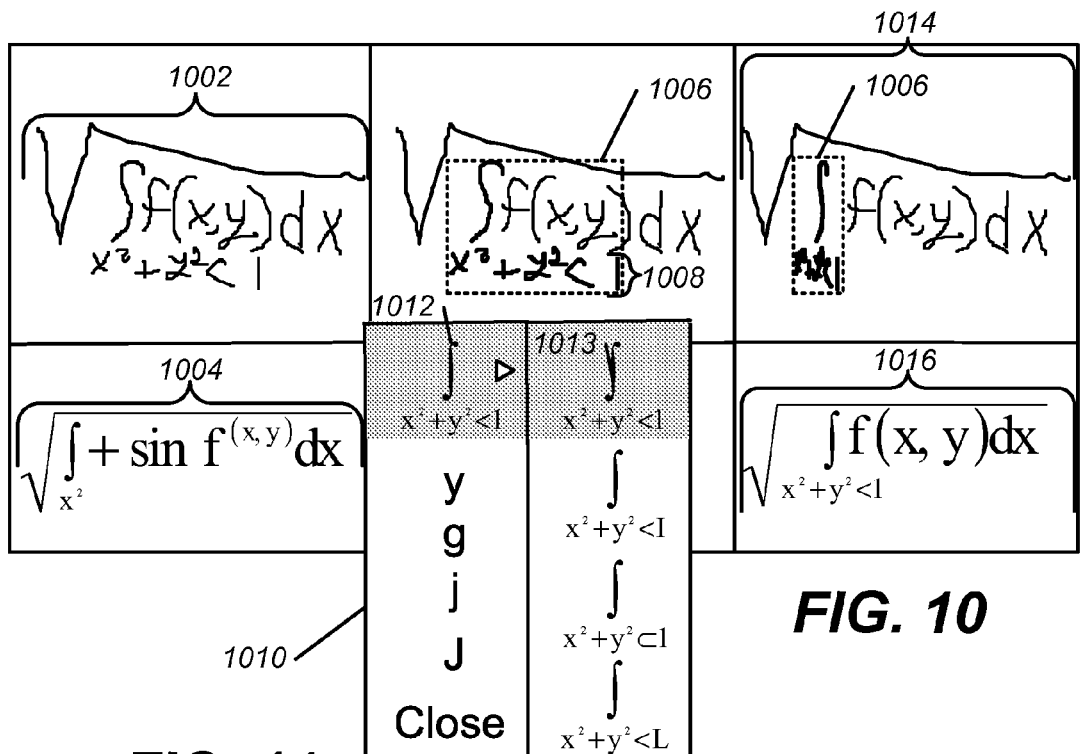

FIG. 10 illustrates a fourth ink parsing correction example. The recognizer may incorrectly parse input atoms 1002 such that recognition result 1004 is incorrect. Using a selection tool, a user may select a region 1006 corresponding to the ink parsing error. Region 1006 may be shown by a bounding box surrounding one or more atoms. In this example, the bounding box surrounds atoms 1008, shown in bold. The recognizer may recognize atoms 1008 in isolation and may provide, or display, a first menu 1010 including a form of a best recognition result and several alternate recognition results with respect to atoms 1008. In this example, the user may select form 1012. In response to a selection of form 1012, several possible recognition results corresponding to form 1012 may be presented. The user may then select recognition result 1013 as a correction hint. Region 1006 may then be shrunk in order to separate atoms 1008 from any other atoms that were originally in region 1006. Atoms 1008 may be transformed in proportion to shrunken region 1006. Atoms 1014 may then be re-recognized to produce correct recognition result 1016.

Matrix Correction Features

Mathematical structures may have specific correction features based on leveraging information from correction hints. The correction hints may be utilized as much as possible, such that errors, which may not be correctable via other methods, maybe corrected with specific correction features for some structures.

Matrix correction features may correct a number of rows and/or a number of columns of a matrix. In addition to using matrix correction features for matrices, other correction features, previously discussed, may also be used for matrices, as well as other mathematical structures.

As previously discussed, every correction hint may be given as a rewriting rule. Rules for correcting matrices may include:
1. Correction of an over-grouping error (too many columns or rows recognized): If $R_0$ is a main region in a correction hint, then if any atom of the region $R_0$ belongs to matrix cell, then all atoms of the region $R_0$ are to be inside that same cell. Otherwise, the matrix may be invalid and cannot be recognized.
2. Correction of an under-grouping error (too few columns or rows recognized): If $R_0$ is the main region in a correction hint, then a matrix in which $R_0$ is a complete cell (that is, the cell that contains the whole region $R_0$ and no other atoms) may be created. The corrected matrix may not be a final recognition result. However, a possibility that the corrected matrix is the final recognition result may be checked and evaluated.

Rule 1 of the matrix correction feature is deterministic and may automatically be respected. Rule 2 represents one possible recognition result which may not be a best result. An example of when rule 2 may not be respected is when a correction is made inside a matrix cell. In this example, the correction doesn't mean matrix cells should be divided into multiple matrix cells.

Figure 11:
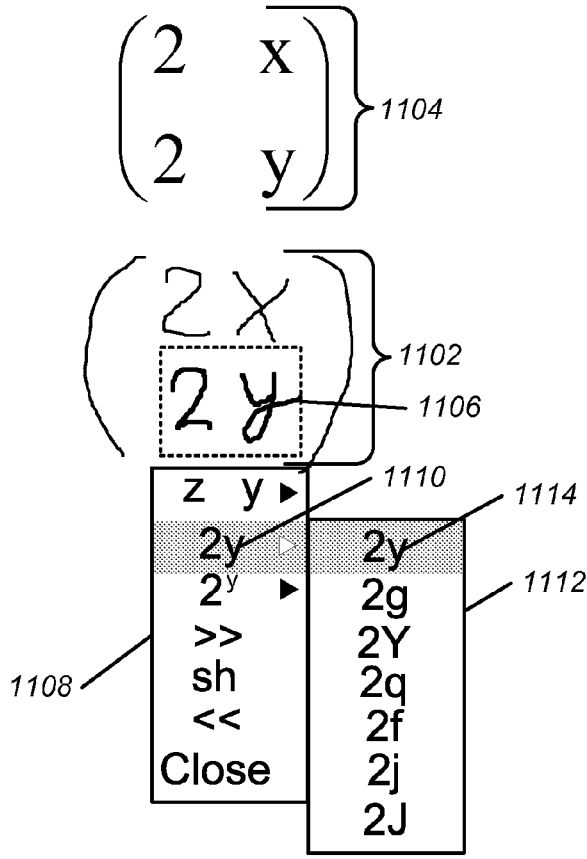
Figure 12:
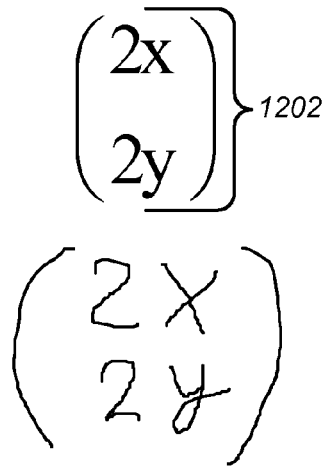

FIG. 11 shows an example of the matrix correction feature. Input atoms 1102 may be recognized to produce a recognition result 1104, which is a matrix having 2 rows and 2 columns. A user may select atoms 1106 using a selection tool to define a region including atoms 1106. As a result, atoms 1106 may be recognized in isolation to produce possible recognition results, the possible recognition results may be added to previously determined possible recognition results for the region, and a first menu 1108 may be displayed and may include one or more of the possible recognition results. The user may select result 1110, which may cause a second menu 1112, which may include several possible alternate recognition results corresponding to result 1110, to be displayed. The user may then select alternate recognition result 1114 indicating that "2y" is to be recognized as part of a single matrix cell. Thus, rule 1 of the matrix correction feature is satisfied in that the correction hint indicates that atoms 1106 are to be recognized as part of a single matrix cell. Input atoms 1102 may be re-recognized and the correction hint may be considered such that a correct recognition result 1202 (FIG. 12) may be produced to correct an over-grouping error.

FIG. 13 shows a second example of the matrix correction feature. Input atoms 1302 may be recognized as a recognition result 1304, which is a value within parentheses (a 1 by 1 matrix). A user may select atom 1306 using a selection tool. As a result, atom 1306 may be recognized in isolation to produce possible recognition results, the possible recognition results may be added to previously determined possible recognition results for a same region, and a menu 1308 may be displayed including several possible alternate recognition results corresponding to atom 1306. The user may then select alternate recognition result 1314 indicating that "δ" may represent contents of a complete matrix cell. In other words, rule 2 of the matrix correction feature is satisfied. A correction hint indicating that atom 1306 corresponds to "δ" may be considered during a re-recognition of input atoms 1302. Input atoms 1302 may be re-recognized and the correction hint may be considered and evaluated when selecting a recognition result from among possible recognition results. FIG. 14 illustrates a correct recognition result 1402 (FIG. 14) being produced to correct the under-grouping error shown in FIG. 13.

As mentioned previously, other error correction techniques may be used with mathematical structures. FIG. 15 illustrates an example in which another error correction technique may be used to correct a matrix structure.

Input atoms 1502 may include atoms 1504, which may be incorrectly parsed. With a selection tool, a user may select a region 1506 including atom 1504. Atom 1504, indicated in bold, may be recognized in isolation to produce possible recognition results, the possible recognition results may be added to previously determined possible recognition results for the region, and a menu 1508 may be presented to the user. The user may select a possible recognition result 1510, corresponding to atom 1504, resulting in region 1506 being shrunk and atom 1504 being transformed in proportion to shrunken region 1506, such that a region including atom 1504 may be separable from a region including another atom of original region 1506, as shown in FIG. 16. Atoms 1612 may be re-recognized to produce a correct result 1602, shown in FIG. 16.

Root Structure Correction Features

Root structure correction features are related to correction of nth root structures and square root structures. Other correction features discussed above, except for matrix correction features, may be applied to square root structures, nth root structures, as well as other mathematical structures.

Root structure correction features may be based on correction hints. As mentioned previously, every correction hint may be given as a rewriting rule. The rules for the root structure correction feature may include:

1. If any stroke from a region $R_0$ is inside an expression under a root symbol, then all strokes from the region $R_0$ are to be included in the expression under the root symbol. This rule is for both n-th root structures and square root structures.

FIG. 17 illustrates the root structure correction features. Input atoms 1702 may be misrecognized and incorrect recognition result 1706 may be produced and displayed. Using a selection tool, a user may select a region including atoms 1704 corresponding to a misrecognized portion of incorrect recognition result 1706 to produce possible recognition results, the possible recognition results may be added to previously determined possible recognition results for the region. As a result, a menu 1708 may be displayed and may include several alternate recognition results based, at least partially, on recognizing atoms 1704 in isolation. The user may select alternate recognition result 1710 as a correction hint. Atoms 1704 include a stroke inside an expression under a root symbol. Therefore, rule 1 is satisfied. Because rule 1 is satisfied, all strokes of atoms 1704 are to be included in the expression under the root symbol. Thus, the correction hint indicates that all of atoms 1704 are to be included under the root symbol and atoms 1704 correspond to "$z^2$". Input atoms 1702 may be re-recognized, respecting the correction hint, to produce correct recognition result 1802 (FIG. 18).

Exemplary Processes

Figure 19:
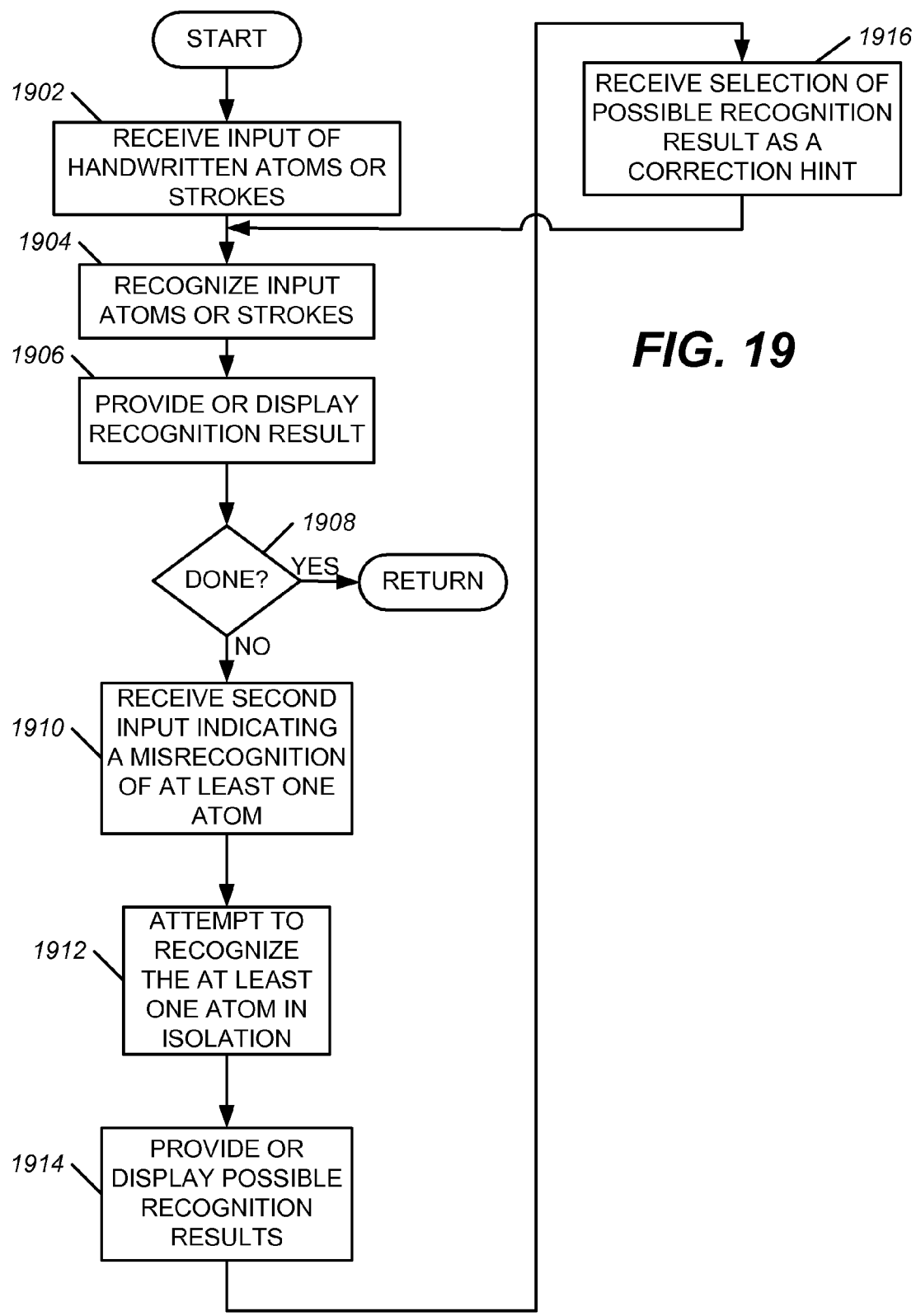

FIG. 19 illustrates a flowchart of an exemplary process for correcting a misrecognition, which may be performed in embodiments consistent with the subject matter of this disclosure. The process may begin with a processing device, such as, for example, processing device 100, receiving input handwritten atoms, or strokes (act 1902). The processing device may then recognize the input atoms or strokes (act 1904).

FIGS. 20-21 are flowcharts illustrating an exemplary process for performing act 1904 in embodiments consistent with the subject matter of this disclosure. The process may begin with the processing device determining whether any correction hints indicate an ink parsing error (act 2002). A correction hint may indicate an ink parsing error when a symbol associated with the correction hint was not originally considered as part of a possible recognition result, with respect to one or more atoms of the correction hint. If the processing device determines that a correction hint indicates an ink parsing error, then the processing device may apply the correction and may shrink the one or more atoms associated with the correction hint (act 2004). This may be applied with respect to any correction hint indicating an ink parsing error.

Figure 22:
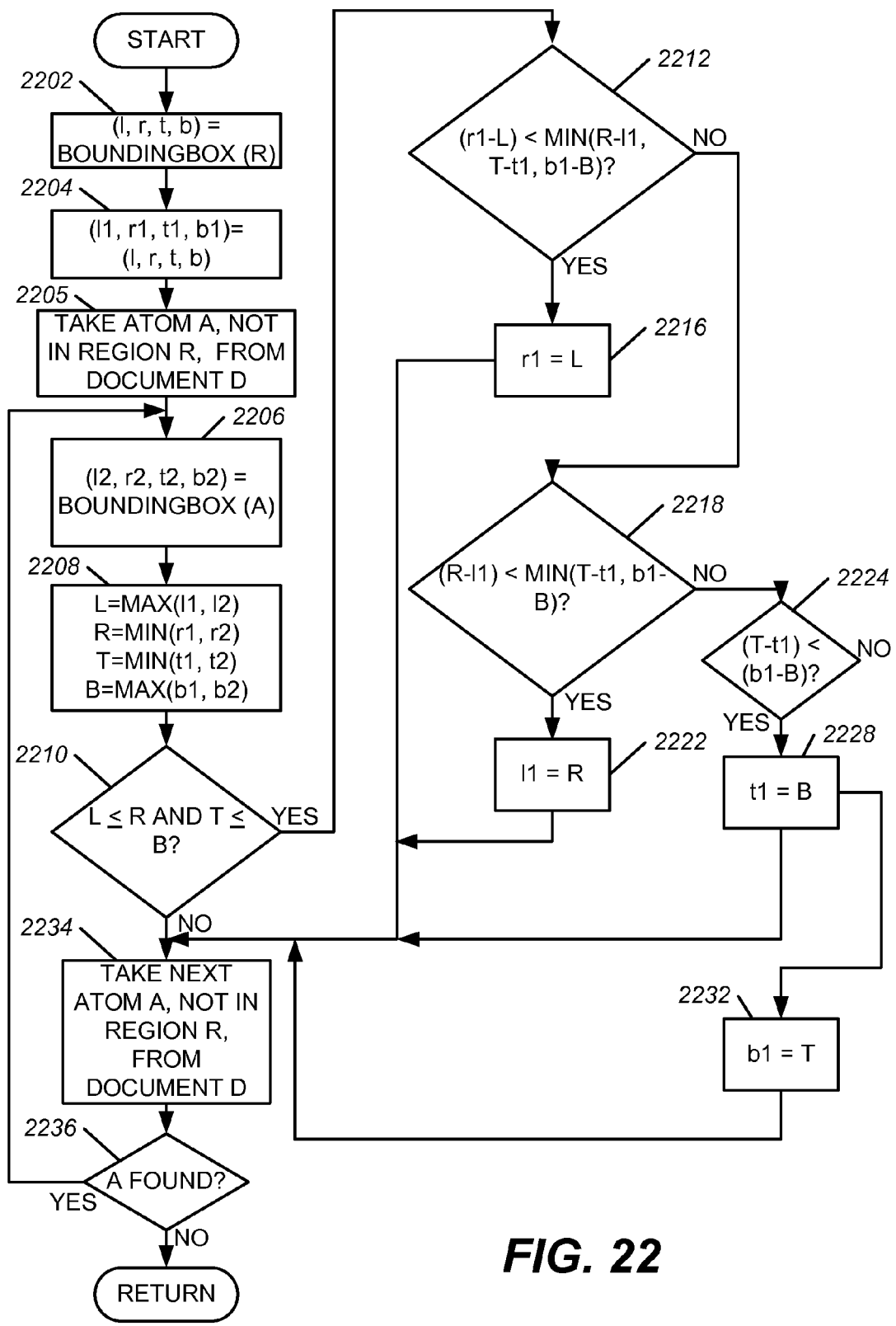

FIG. 22 is a flowchart illustrating exemplary processing with respect to act 2004 in an embodiment consistent with the subject matter this disclosure. The process may begin with l, r, t, and b being set to a left coordinate, a right coordinate, a top coordinate, and a bottom coordinate, respectively, of a first bounding box defining a region R (act 2202). The first bounding box surrounds one or more atoms corresponding to an ink parsing error. A bounding box may be defined as a minimal rectangle which contains a whole region or a whole document atom. In some embodiments, the coordinates may be relative to a Cartesian coordinate system.

Next, l1, r1, t1, and b1 may be set to l, r, t, b, respectively (act 2204). Coordinates l1, r1, t1, and b1 may be a left coordinate, a right coordinate, a top coordinate, and a bottom coordinate, respectively, of a shrunken region, which may originally be set to coordinates of the first bounding box.

Next, an atom A in document D, but not in region R may be taken, or selected (act 2205). Coordinates l2, r2, t2, and b2 may be set to a left coordinate, a right coordinate, a top coordinate, and a bottom coordinate, respectively, of an atom bounding box of the atom A (act 2206).

L may then be set to a maximum value of l1 and l2, R may be set to a minimum value of r1 and r2, T may be set to a minimum value of t1 and t2, and B may be set to a maximum value of b1 and b2 (act 2208). A check may then be performed to determine whether $L \leq R$ and $T \leq B$ (act 2210). If $L > R$ or $T > B$, then shrinking of the region may not be performed. Otherwise, the bounding boxes may overlap one another and minimal shrinking of the first bounding box may be performed. Thus, if $L \leq R$ and $T \leq B$, then a check may be performed to determine if $(r1-L) < MIN(R-l1, T-t1, b1-B)$ (act 2212). If $(r1-L) < MIN(R-l1, T-t1, b1-B)$, then r1 may be set to L (act 2216).

If, during act 2212, the check determines that $(r1-L) \geq MIN(R-l1, T-t1, b1-B)$, then a check may be performed to determine if $(R-l1) < MIN(T-t1, b1-B)$ (act 2218). If $(R-l1) < MIN(T-t1, b1-B)$, then l1 may be set to R (act 2222).

If, during act 2218, the check determines that $(R-l1) \geq MIN(T-t1, b1-B)$, then a check may be performed to determine if $(T-t1) < (b1-B)$ (act 2224). If $(T-t1) < (b1-B)$, then t1 may be set to B (act 2228).

If, during act 2224, $(T-t1)$ is determined to be $\geq (b1-B)$, then b1 may be set to T (act 2232).

A next atom A, not in region R may then be taken, or selected (act 2234). A check may be performed to determine if the next atom A exists, or is found (act 2236). If the next atom A is found then acts 2206-2236 may be repeated. Otherwise the process is completed.

As a result of performing the process of FIG. 22, the shrunken bounding box may be strictly inside an area defined by the first bounding box as originally defined.

Returning to FIG. 20, after determining that no correction hints indicate a parsing error, or after determining that one or more correction hints indicate a parsing error and shrinking of one or more atoms has been performed, then the processing device may apply a rewriting rule of a grammar to one or more atoms (act 2006). The processing device may then determine whether the applied rewriting rule conforms to, or respects, all of the correction hints (act 2008).

Figure 23:
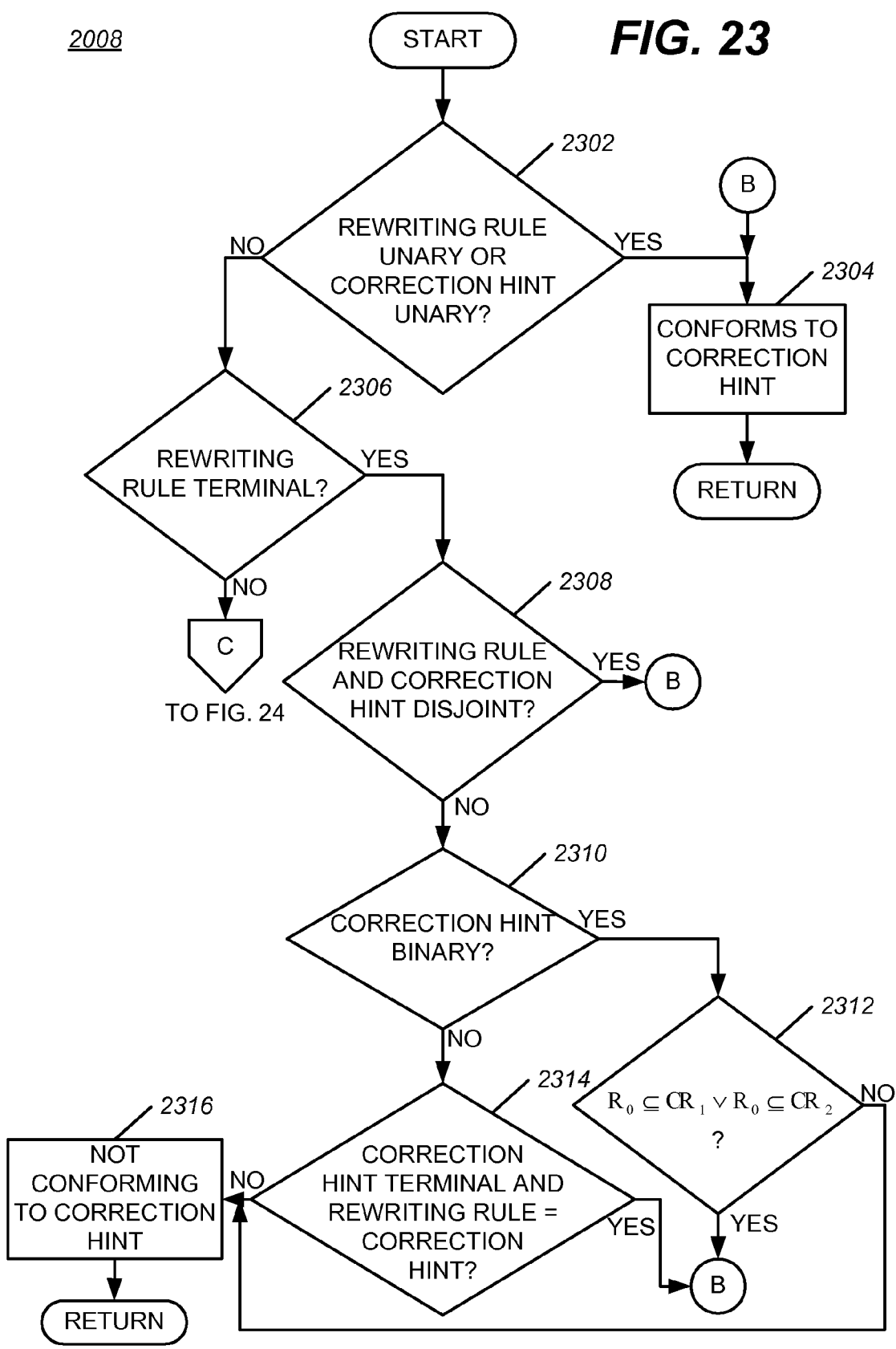

FIGS. 23 and 24 are flowcharts illustrating exemplary processing for determining whether a rewriting rule respects, or conforms to, a correction hint in embodiments consistent with the subject matter of this disclosure. The process may begin with the processing device determining whether the rewriting rule is unary (i.e. $R_{L1} \neq 0, R_{L2} = 0$) or whether the correction hint is unary (i.e., $CR_{L1} \neq 0, CR_{L2} = 0$) (act 2302). If the rewriting rule is unary or the correction hint is unary, then an indication may be set indicating that the rewriting rule conforms to, or respects, the correction hint (act 2304) and the process may be complete.

If, during act 2302, the processing device determines that the rewriting rule is not unary and the correction hint is not unary, then the processing device may determine whether the rewriting rule is terminal (i.e. $R_{L1} = 0, R_{L2} = 0$) (act 2306).

If, during act 2306, the rewriting rule is determined to be terminal, then processing device may determine whether the rewriting rule and the correction hint are disjoint (i.e. $R_0 \cap CR_0 = 0$) (act 2308). If the rewriting rule and the correction hint are disjoint, then an indication may be set indicating that the rewriting rule conforms to, or respects, the correction hint (act 2304) and the process may be complete.

If, during act 2308, the processing device determines that the rewriting rule and the correction hint are not disjoint, then the processing device may determine if the correction hint is binary (i.e. $CR_{L1} \neq 0, CR_{L2} \neq 0$) (act 2310). If the correction hint is determined to be binary, then the processing device may determine if a region of the terminal rewriting rule is a subset of one of two regions from a right-hand side of a definition of the correction hint (i.e. $R_0 \subset CR_1 \vee R_0 \subset CR_2$) (act 2312). If so, then an indication may be set indicating that the rewriting rule conforms to, or respects, the correction hint (act 2304) and the process may be complete.

If, during act 2312, the region of the terminal rewriting rule is not a subset of one of two regions from the right-hand side of the definition of the correction hint, then an indication may be set indicating that the rewriting rule does not conform to, or does not respect, the correction hint (act 2316) and the process may be complete.

If, during act 2310, the processing device determines that the correction hint is not binary, then the processing device may determine if the correction hint is terminal (i.e. $CR_{L1} = 0$, $CR_{L2} = 0$) and the rewriting rule and the correction hint are equal (act 2314). If so, then an indication may be set indicating that the rewriting rule conforms to, or respects, the correction hint (act 2304) and the process may be complete. Otherwise, if, during act 2314, the correction hint is not terminal or the rewriting rule is not equal to the correction hint, then an indication may be set indicating that the rewriting rule does not conform to, or does not respect, the correction hint (act 2316) and the process may be complete.

If, during act 2306, the processing device determines that the rewriting rule is not terminal, then the processing device may determine whether the rewriting rule is binary (i.e. $R_{L1} \neq 0, R_{L2} \neq 0$) (act 2402; FIG. 24). If, during act 2402, the processing device determines that the rewriting rule is not binary, then an indication may be set indicating that the rewriting rule does not conform to, or does not respect, the correction hint (act 2414) and the process may be complete.

If, during act 2402, the processing device determines that rewriting rule is binary, then the processing device may determine whether the rewriting rule and the correction hint are disjoint (i.e. $R_0 \cap CR_0 = 0$) (act 2406). If the rewriting rule and the correction hint are determined to be disjoint, then an indication may be set indicating that the rewriting rule conforms to, or respects, the correction hint (act 2408) and the process may be complete.

If, during act 2406, the processing device determines that the rewriting rule and the correction hint are not disjoint, then the processing device may determine if the correction hint is binary (i.e. $CR_{L1} \neq 0, CR_{L2} \neq 0$) and a main region of the binary rewriting rule is a subset of one of two regions of a right-hand side of the correction hint or a main region of the correction hint is a subset of one of two regions on a right-hand side of the rewriting rules (i.e. $R_0 \subset CR_1 \vee R_0 \subset CR_2 \vee CR_0 \subset R_1 \vee CR_0 \subset R_2$) (act 2410). If so, then an indication may be set indicating that the rewriting rule conforms to, or respects, the correction hint (act 2408) and the process may be complete.

If, during act 2410, the processing device determines that the condition is not true, then the processing device may determine whether the correction hint is terminal (i.e. $CR_{L1} = 0, CR_{L2} = 0$) and a main region of the correction hint is a subset of one of two regions on a right-hand side of the binary rewriting rule (i.e. $CR_0 \subset R_1 \vee CR_0 \subset R_2$) (act 2412). If the condition checked during act 2412 is true, then an indication may be set indicating that the rewriting rule conforms to, or respects, the correction hint (act 2408) and the process may be complete. Otherwise, an indication may be set indicating that the rewriting rule does not conform to, or does not respect, the correction hint (act 2414) and the process may be complete.

Returning to FIG. 20, if the rewriting rule does not conform to, or does not respect correction hint(s), then a penalty score may be added to a sum of rewriting rules applied to produce a possible recognition result (act 2010). If the rewriting rule conforms to, or respects, the correction hint(s), then a rewriting rule score (as may be assigned by a recognizer) may be added to the sum of rewriting rules applied to produce the possible recognition result (act 2012).

After performing act 2012 or act 2010, the processing device may determine whether there are additional productions which may be produced by applying more rewriting rules (act 2014). If additional productions may be produced, then acts 2006-2014 may again be performed. If no additional productions may be produced (i.e. all atoms are assigned to terminal productions), then the processing device may save the sum as a score of the possible recognition result and may save the possible recognition result (act 2016).

The processing device may then determine whether additional sequences of rewriting rules may be applied to the input atoms (act 2018). If additional productions sets may be produced, then the processing device may choose a rewriting rule to apply to the input atoms to start a new sequence of rewriting rules (act 2020). Acts 2006-2020 may again be performed.

If, during act 2018, the processing device determines that no additional sequences of rewriting rules may be produced, then the processing device may select, as a recognition result, one of a number of possible recognition results corresponding to a best score (act 2102; FIG. 21). As mentioned previously, a best score may be a highest score. However, in some embodiments, a best score may be a lowest score.

Returning to FIG. 19, the processing device may then provide, or display, the selected recognition result (act 1906). The processing device may then determine whether the process is done (act 1908). The process may be indicated as done when a user enters a particular input, after a predetermined amount of time has passed with no input being entered, or by any number of other actions or conditions.

If the process is not done, then the processing device may receive a second input indicating a misrecognition of at least one atom (act 1910). The second input may be a selection of one or more atoms corresponding to the misrecognition, such that the selection defines a region including the one or more atoms. The processing device may then attempt to recognize, in isolation, the selected one or more atoms in the defined region (act 1912). The processing device may then provide, or display, a number of possible recognition results (act 1914). The processing device may receive a selection of one of the possible recognition results as a correction hint (act 1916). Acts 1904-1916 may again be repeated.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. Further, implementations consistent with the subject matter of this disclosure may have more or fewer acts than as described in FIGS. 20-24, or may implement acts in a different order than as shown in FIGS. 20-24. Accordingly, the appended claims and their legal equivalents define the scope of the invention, rather than any specific examples given.

We claim as our invention:

1. A machine-implemented method for correcting a recognized handwritten mathematical expression, the machine-implemented method comprising:
   receiving input indicating a region having at least one atom of a plurality of atoms corresponding to a misrecognized production of a recognized mathematical expression;
   providing a menu of possible recognition results based on the at least one atom in the region;
   receiving a selection of one of the possible recognition results as a correction hint;
   shrinking the region and linearly transforming the at least one atom corresponding to the correction hint such that the at least one atom is horizontally or vertically separate from other atoms of the plurality of atoms; and
   re-recognizing the plurality of atoms, including the at least one linearly transformed atom, to produce a correctly recognized mathematical expression.

2. The machine-implemented method of claim 1, wherein:
   the re-recognizing of the plurality of atoms, including the at least one linearly transformed atom, further comprises:
      adding a penalty score to each applied one of a plurality of rewriting rules which does not respect the correction hint, and
      selecting a best recognition result from among a plurality of possible recognition results based on a sum of scores assigned to each one of the plurality of rewriting rules applied to produce each respective one of the plurality of possible recognition results.

3. The machine-implemented method of claim 1, wherein:
   the region is indicated by a bounding box, and
   the shrinking of the region produces a minimal bounding box.

4. The machine-implemented method of claim 1, wherein:
   the region is indicated by a bounding box, and
   the shrinking of the region further comprises:
      determining whether the bounding box bounding the at least one atom corresponding to the correction hint, overlaps a second bounding box bounding at least one of the others of the plurality of atoms, and
      shrinking the bounding box to produce a shrunken bounding box when the bounding box and the second bounding box are determined to overlap, the shrunken bounding box being a minimal bounding box separated from the second bounding box.

5. The machine-implemented method of claim 1, further comprising:
   receiving a second input indicating a second region including at least one atom of the plurality of atoms corresponding to a misrecognized symbol included in a matrix;
   providing a second menu of second possible recognition results based on the at least one atom in the second region;
   receiving a second selection of one of the second possible recognition results as a second correction hint;
   determining whether the matrix has an over-grouping error based on the second correction hint; and
   leveraging the second correction hint to correct the over-grouping error.

6. The machine-implemented method of claim 1, further comprising:
   receiving a second input indicating a second region having a second plurality of atoms of the plurality of atoms corresponding to a portion of the handwritten mathematical expression, at least some of the second plurality of atoms having been misrecognized as a symbol not being under a root symbol;
   providing a second menu of second possible recognition results based on the second plurality of atoms;
   receiving a second selection of one of the second possible recognition results as a second correction hint;
   determining whether a first part of the second plurality of atoms corresponding to the second correction hint is under a root structure and whether a second part of the second plurality of atoms corresponding to the second correction hint is not under the root structure; and recognizing the second plurality of atoms, according to the second correction hint, as at least one symbol under the root structure when the first part of the second plurality of atoms is determined to be under a root structure and the second part of the second plurality of atoms is determined to be not under the root structure.

7. The machine-implemented method of claim 1, further comprising:

receiving a second input indicating a second region having at least one atom of the plurality of atoms corresponding to a misrecognized portion of the handwritten mathematical expression;

providing a second menu of second possible recognition results based on the at least one atom of the plurality of atoms corresponding to the misrecognized portion of the handwritten mathematical expression, the second possible recognition results being among a top plurality of scores calculated by summing scores assigned to each one of a plurality of rewriting rules applied to produce each respective one of the plurality of second possible recognition results;

receiving a second selection of one of the second possible recognition results as a second correction hint;

adding a penalty score to each one of the plurality of rewriting rules which does not respect the second correction hint; and re-recognizing the plurality of atoms of the handwritten mathematical expression, the re-recognizing further comprising:

selecting a best recognition result from among a third plurality of possible recognition results based on a sum of scores assigned to each one of the plurality of rewriting rules applied to produce each respective one of the third plurality of possible recognition results.

8. A processing device for recognizing a plurality of atoms of structured handwritten input, the processing device comprising:

at least one processor; and a memory connected to the at least one processor, the memory further comprising:

instructions for receiving an input indicating a second plurality of atoms of the plurality of atoms corresponding to a portion of the structured handwritten input, at least some of the second plurality of atoms having been misrecognized as a symbol not being under a root structure, instructions for displaying a menu of possible recognition results based on the second plurality of atoms, instructions for receiving a selection of one of the possible recognition results as a correction hint, instructions for determining whether a first part of the second plurality of atoms, corresponding to the correction hint, is under the root structure and whether a second part of the second plurality of atoms, corresponding to the correction hint, is not under the root structure; and instructions for recognizing the plurality of atoms, in conformance with the second correction hint, as including at least one symbol under the root structure, corresponding to the first part of the second plurality of atoms and the second part of the second plurality of atoms, when the first part of the second plurality of atoms is determined to be under the root structure and the second part of the second plurality of atoms is determined to be not under the root structure.

9. The processing device of claim 8, wherein:

the instructions for recognizing the plurality of atoms, in conformance with the second correction hint, further comprise:

instructions for producing a second plurality of possible recognition results by summing scores corresponding to ones of a plurality of rewriting rules applied when producing each of the ones of the second plurality of possible recognition results from the plurality of atoms, instructions for determining whether applying any of the ones of the plurality of rewriting rules to the plurality of atoms to produce the ones of the second plurality of possible recognition results conforms with the correction hint, instructions for adding a penalty score to ones of the sums of the scores having a corresponding rewriting rule not conforming to the correction hint, and instruction for selecting a best recognition result from the second plurality of possible recognition results, the best recognition result having a highest score among the summed scores of each of the ones of the second possible recognition results.

10. The processing device of claim 9, wherein:

the instructions for determining whether applying any of the ones of the plurality of rewriting rules to the plurality of atoms to produce the ones of the second plurality of possible recognition results conforms with the correction hint further comprises:

instructions for determining that applying a rewriting rule conforms with the correction hint when the rewriting rule is unary or the correction hint is unary, instructions for determining that applying the rewriting rule conforms with the correction hint when the rewriting rule is terminal and (i) the rewriting rule is disjoint with the correction hint, (ii) the correction hint is binary and a region of the rewriting rule is a subset of one of two regions of the correction hint, or (iii) when the rewriting rule is equivalent to the correction hint, and instructions for determining that applying the rewriting rule conforms with the correction hint when the rewriting rule is binary and (i) the rewriting rule is disjoint with the correction hint, (ii) the correction hint is binary and either a main region of the rewriting rule is a subset of one of the two regions of the correction hint or a main region of the correction hint is a subset of one of the two regions of the rewriting rule, or (iii) the correction hint is terminal and the main region of the correction hint is a subset of one of the two regions of the rewriting rule.

11. The processing device of claim 8, wherein the memory further comprises:

instructions for receiving a second input indicating at least one atom of the plurality of atoms;

instructions for displaying a second menu including alternate recognitions of the at least one atom, each of the alternate recognitions having a respective score being lower than an original score corresponding to an original recognition with respect to the at least one atom of the plurality of atoms;

instructions for receiving a second selection of one of the alternate recognitions as a second correction hint;

instructions for producing a second plurality of possible recognition results based on summed scores corresponding to ones of a plurality of rewriting rules applied when producing each of the ones of the second plurality of possible recognition results from the plurality of atoms;

instructions for determining whether applying any of the ones of the plurality of rewriting rules to the plurality of atoms to produce the ones of the second plurality of possible recognition results conforms with the second correction hint;

instructions for adding a penalty score to ones of the sums of the scores having a corresponding rewriting rule not conforming to the second correction hint; and instruction for selecting a best recognition result from the second plurality of possible recognition results, the best recognition result having a highest score among the summed scores of each of the ones of the second possible recognition results.

12. The processing device of claim 8, wherein the memory further comprises:

instructions for receiving a second input indicating a second plurality of atoms of the plurality of atoms corresponding to at least one misrecognized symbol included in a matrix;

instructions for displaying a second menu of second possible recognition results based on the indicated second plurality of atoms;

instructions for receiving a second selection of one of the second possible recognition results as a second correction hint;

instructions for determining whether the second correction hint indicates that the second plurality of atoms is to be in a single matrix cell; and instructions for leveraging the second correction hint to correct an over-grouping error when the second correction hint is determined to indicate that the second plurality of atoms is to be in a single matrix cell.

13. The processing device of claim 12, wherein the instructions for leveraging the second correction hint to correct an over-grouping error when the second correction hint is determined to indicate that the second plurality of atoms is to be in a single matrix cell further comprise:

instructions for producing a third plurality of possible recognition results by summing scores corresponding to ones of a plurality of rewriting rules used when producing each of the ones of the third plurality of possible recognition results from the plurality of atoms;

instructions for determining whether applying any of the ones of the plurality of rewriting rules to the plurality of atoms to produce the ones of the third plurality of possible recognition results conforms with the second correction hint;

instructions for adding a penalty score to ones of the sums of the scores having a corresponding rewriting rule not conforming to the second correction hint; and instruction for selecting a best recognition result from the third plurality of possible recognition results.

14. A tangible machine-readable medium having instructions for at least one processor recorded thereon, the instructions comprising:

instructions for receiving input indicating at least one atom of a plurality of atoms of handwritten input, the at least one atom having been misrecognized by a recognizer;

instructions for displaying a menu of possible recognition results based on the at least one atom;

instructions for receiving a selection of one of the possible recognition results as a correction hint; and instructions for leveraging the correction hint to produce a corrected recognition result, the instructions for leveraging the correction hint to produce a corrected recognition result further comprising at least one group of instructions selected from:

a first group of instructions for linearly transforming the at least one atom corresponding to the correction hint such that the at least one atom is horizontally or vertically separate from other atoms of the plurality of atoms, a second group of instructions for leveraging the correction hint to correct an over-grouping error of a matrix when the second correction hint indicates that the at least one atom is to be in a single cell of a matrix, and a third group of instructions for recognizing the at least one atom as being under a root structure when the correction hint indicates that a first part of the at least one atom corresponding to the correction hint is under a root structure and a second part of the at least one atom corresponding to the correction hint is not under the root structure.

15. The tangible machine-readable medium of claim 14, wherein the instructions for leveraging the correction hint to produce a corrected recognition result further comprise at least two groups of instructions selected from:

the first group of instructions, the second group of instructions, and the third group of instructions.

16. The tangible machine-readable medium of claim 14, wherein the instructions for leveraging the correction hint to produce a corrected recognition result further comprise:

instructions for producing a plurality of second possible recognition results by summing scores corresponding to ones of a plurality of rewriting rules used when producing each one of the plurality of second possible recognition results from the plurality of atoms;

instructions for determining whether applying any of the ones of the plurality of rewriting rules to the plurality of atoms to produce the ones of the plurality of second possible recognition results does not conform with the correction hint;

instructions for adding a penalty score to ones of the sums of the scores having a corresponding rewriting rule not conforming with the correction hint; and instruction for selecting a best recognition result from the plurality of second possible recognition results, based on the summed scores of each of the ones of the plurality of second possible recognition results.

17. The tangible machine-readable medium of claim 16, wherein the instructions for determining whether applying any of the ones of the plurality of rewriting rules to the plurality of atoms to produce the ones of the plurality of second possible recognition results does not conform with the correction hint further comprise:

instructions for determining that applying a rewriting rule conforms with the correction hint when the rewriting rule is unary or the correction hint is unary, instructions for determining that applying the rewriting rule conforms with the correction hint when the rewriting rule is terminal and (i) the rewriting rule is disjoint with the correction hint, (ii) the correction hint is binary and a region of the rewriting rule is a subset of one of two regions of the correction hint, or (iii) the rewriting rule is equivalent to the correction hint, and instructions for determining that applying the rewriting rule conforms with the correction hint when the rewriting rule is binary and (i) the rewriting rule is disjoint with the correction hint, (ii) the correction hint is binary and either a main region of the rewriting rule is a subset of one of the two regions of the correction hint or a main region of the correction hint is a subset of one of the two regions of the rewriting rule, or (iii) the correction hint is terminal and the main region of the correction hint is a subset of one of the two regions of the rewriting rule.

18. The tangible machine-readable medium of claim 14, wherein:
  the instructions for leveraging the correction hint to produce a corrected recognition result further comprise the first group of instructions,
  the received input defines a bounding box surrounding the at least one atom, and
  the first group of instructions further comprise:
    instructions for determining whether the bounding box bounding the at least one atom corresponding to the correction hint overlaps any other atoms not part of the correction hint, and
    instructions for shrinking the bounding box to produce a shrunken bounding box when the bounding box is determined to overlap any of the other atoms not part of the correction hint, the shrunken bounding box not overlapping any of the other atoms, and the at least one atom being linearly transformed in proportion to the shrinking of the bounding box.

19. The tangible machine-readable medium of claim 18, wherein the instructions for shrinking the bounding box to produce a shrunken bounding box when the bounding box is determined to overlap any of the other atoms not part of the correction hint further comprise:
  instructions for shrinking the bounding box no more than a minimal amount such that the bounding box does not overlap with any of the other atoms.

20. The tangible machine-readable medium of claim 18, wherein the shrunken bounding box is strictly inside an area defined by the bounding box.

\* \* \* \* \*